US009255539B2

(12) United States Patent
Iwai et al.

(10) Patent No.: US 9,255,539 B2
(45) Date of Patent: *Feb. 9, 2016

(54) SPARK-IGNITION DIRECT INJECTION ENGINE

(71) Applicant: Mazda Motor Corporation, Aki-gun, Hiroshima (JP)

(72) Inventors: Kouhei Iwai, Hiroshima (JP); Masahisa Yamakawa, Hiroshima (JP); Kazuhiro Nagatsu, Hiroshima (JP); Hiroyuki Kurita, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 273 days.

This patent is subject to a terminal disclaimer.

(21) Appl. No.: 13/971,769

(22) Filed: Aug. 20, 2013

(65) Prior Publication Data

US 2014/0060493 A1    Mar. 6, 2014

(30) Foreign Application Priority Data

Aug. 29, 2012   (JP) .................................. 2012-189116

(51) Int. Cl.
*F02P 5/00*   (2006.01)
*F02D 41/30*  (2006.01)
(Continued)

(52) U.S. Cl.
CPC ............. *F02D 41/30* (2013.01); *F02B 23/101* (2013.01); *F02B 29/0418* (2013.01); *F02B 29/0437* (2013.01); *F02D 13/0207* (2013.01); *F02D 13/0219* (2013.01); *F02D 13/0265* (2013.01); *F02D 13/0273* (2013.01);
(Continued)

(58) Field of Classification Search
CPC . F02D 41/401; F02D 41/402; F02D 41/3035; F02D 41/0057; F02D 204/001; F02M 25/0728; F02M 25/0752; F02B 23/101
USPC ............... 123/434, 478, 480, 568.11, 568.12, 123/568.21, 568.31
See application file for complete search history.

(56) References Cited

U.S. PATENT DOCUMENTS 8,838,364 B2 *   9/2014   Nagatsu et al. ................ 701/104
2003/0056752 A1 *  3/2003   Sukegawa et al. ............. 123/305
(Continued)

FOREIGN PATENT DOCUMENTS

JP   2007154859 A   6/2007
JP   2009197740 A   9/2009

*Primary Examiner* — John Kwon
(74) *Attorney, Agent, or Firm* — Alleman Hall McCoy Russell & Tuttle LLP

(57) ABSTRACT

A spark-ignition engine is provided. The engine includes an engine body, a fuel injection valve, an ignition plug, an EGR introduction system, and a controller for operating the engine body by controlling the fuel injection valve, the ignition plug, and the EGR introduction system. The controller controls to combust mixture gas by compressing to self-ignite within a compression self-ignition combustion applying range, and to combust the mixture gas by a spark-ignition using the ignition plug within a spark-ignition combustion applying range. Substantially throughout the spark-ignition combustion applying range, the controller controls the EGR introduction system to introduce cooled EGR gas, and within the compression self-ignition applying range, the controller controls the EGR introduction system to introduce hot EGR gas. The controller controls the EGR introduction system to introduce the hot EGR gas and the cooled EGR gas within a low engine load part of the spark-ignition combustion applying range.

7 Claims, 12 Drawing Sheets

(51) Int. Cl.
  F02D 41/00  (2006.01)
  F02P 5/15  (2006.01)
  F02P 5/152  (2006.01)
  F02D 37/02  (2006.01)
  F02B 23/10  (2006.01)
  F02B 29/04  (2006.01)
  F02M 25/07  (2006.01)
  F02D 13/02  (2006.01)

(52) U.S. Cl.
  CPC .......... *F02D 37/02* (2013.01); *F02D 41/0057* (2013.01); *F02D 41/3029* (2013.01); *F02M 25/0728* (2013.01); *F02M 25/0731* (2013.01); *F02M 25/0738* (2013.01); *F02M 25/0752* (2013.01); *F02M 25/0754* (2013.01); *F02P 5/1516* (2013.01); *F02P 5/1527* (2013.01); F02B 2023/102 (2013.01); F02B 2023/103 (2013.01); *Y02T 10/125* (2013.01); *Y02T 10/146* (2013.01); *Y02T 10/18* (2013.01); *Y02T 10/46* (2013.01); *Y02T 10/47* (2013.01)

(56) References Cited

U.S. PATENT DOCUMENTS

| | | | |
|---|---|---|---|
| 2012/0216774 A1* | 8/2012 | Oba et al. | 123/305 |
| 2014/0060490 A1* | 3/2014 | Iwai et al. | 123/478 |
| 2014/0060493 A1* | 3/2014 | Iwai et al. | 123/478 |
| 2014/0069382 A1* | 3/2014 | Iwai et al. | 123/406.47 |

* cited by examiner

SPARK-IGNITION DIRECT INJECTION ENGINE

BACKGROUND

The present invention relates to a spark-ignition engine where compression self-ignition combustion is performed within a low engine load range and spark-ignition combustion is performed within a high engine load range.

Compression self-ignition combustion (hereinafter, also referred to as "CI combustion") where mixture gas inside a cylinder is compressed to self-ignite (Homogeneous Charge Compression Ignition) has advantages that a thermal efficiency improves and a fuel consumption improves, as well as, due to it having a short combustion period but not becoming extreme combustion, generation of nitrogen oxide is suppressed significantly. Therefore, conventionally, with spark-ignition gasoline engines, it has been known to perform spark-ignition combustion (hereinafter, also referred to as "SI combustion") within a high engine load operating range higher than a predetermined load, whereas CI combustion is performed within a lower engine load operating range than the predetermined load so as to improve the fuel consumption and purify exhaust gas (e.g., JP2007-154859A).

Moreover, for example, JP2009-197740A discloses an art for this kind of an engine, in which high-temperature internal EGR gas is introduced into a cylinder within a CI combustion applying range in order to improve ignitability within a low engine load range where an in-cylinder temperature is difficult to increase because a fuel injection amount is small.

Since the CI combustion is a combustion mode that can improve the fuel consumption as described above, it may seem to be preferable to expand the CI combustion applying range further to the higher engine load side. However, when the in-cylinder temperature increases as the engine load increases, the CI combustion will be accompanied by a sharp pressure increase (dP/dt), and the combustion noise may increase. Therefore, as disclosed in JP2007-154859A, even with the engine where the CI combustion is performed within the low engine load range, the SI combustion using an ignition plug is generally performed within the high engine load range.

Thus, as the engine disclosed in JP2009-197740A, unlike the CI combustion applying range where the ignitability is improved by introducing the high-temperature internal EGR gas into the cylinder, within a part of the SI combustion applying range, particularly within a high engine load part thereof, since the in-cylinder temperature is high and thus abnormal combustion may occur, low-temperature external EGR gas which is cooled by heat exchange is generally introduced into the cylinder. Note that, even in the case with CI combustion, within the high engine load range therein, in order to suppress the combustion accompanied by a sharp pressure increase, the low-temperature external EGR gas has been introduced in addition to the high-temperature internal EGR gas.

However, the method of introducing the high-temperature EGR gas into the cylinder within the CI combustion applying range and the low-temperature external EGR gas within the SI combustion applying range has a scope for improvement in the following points. Specifically, in the case with the CI combustion, within the low engine load range therein, since the ignitability is required to be improved, a large amount of high-temperature EGR gas can be introduced into the cylinder. Moreover, within the high engine load range therein, since the low-temperature external EGR gas is also introduced into the cylinder in addition to the high-temperature EGR gas, as a result, a large amount of EGR gas can be introduced into the cylinder. In other words, in the case with the CI combustion, the cylinder can be filled with the large amount of EGR gas, the intake can be performed while a throttle valve is opened and not while the throttle valve is throttled, and therefore, a pumping loss can be effectively reduced. On the other hand, in the case with the SI combustion, since the ignitability needs to be secured while suppressing abnormal combustion, there is a problem that the pumping loss reduction similar to within the CI combustion applying range is difficult to be achieved due to the restriction of the amount of the low-temperature external EGR gas that can be introduced into the cylinder, in other words, due to the fact that the amount of the low-temperature external EGR gas that can be introduced into the cylinder is restricted by the in-cylinder temperature. When the amount of the low-temperature external EGR gas introduced into the cylinder is increased to reduce the pumping loss similarly to within the CI combustion applying range, the in-cylinder temperature decreases excessively mainly within the low engine load range, causing unstable ignitability and combustibility.

SUMMARY

The present invention is made in view of the above situations and provides an art of a spark-ignition engine where CI combustion is performed within a low engine load range and SI combustion is performed within a high engine load range, in which the combustion is suppressed from becoming unstable while reducing a pumping loss mainly within a low engine load part of an SI combustion applying range.

To solve the above described problems, in the spark-ignition engine according to the present invention, within the low engine load part of the SI combustion applying range, a ratio of an EGR gas amount is increased to reduce the pumping loss, and a high temperature EGR gas is aggressively introduced into a cylinder to suppress the combustion from becoming unstable due to a temperature inside the cylinder becoming excessively low.

According to one aspect of the invention, a spark-ignition engine is provided. The engine includes an engine body having a cylinder forming a combustion chamber in a top part thereof and for supplying fuel mainly containing gasoline, a fuel injection valve for injecting the fuel into the combustion chamber, an ignition plug arranged to be oriented toward the inside of the combustion chamber and for igniting mixture gas within the combustion chamber, an EGR introduction system for introducing exhaust gas into the cylinder, and a controller for operating the engine body by controlling at least the fuel injection valve, the ignition plug, and the EGR introduction system. The controller controls the combustion of the mixture gas within the combustion chamber by compressing to self-ignite within a compression self-ignition combustion applying range that is lower in an engine load than a predetermined first engine load, and to combust the mixture gas within the combustion chamber by a spark-ignition using the ignition plug within a spark-ignition combustion applying range that is higher in the engine load than the first engine load.

Throughout the whole spark-ignition combustion applying range except for a throttle valve fully opened range, the controller controls the EGR introduction system to introduce into the cylinder at least the low-temperature cooled EGR gas that is exhaust gas cooled by a heat exchange, and within the compression self-ignition applying range, the controller controls the EGR introduction system to introduce into the cylinder at least the hot EGR gas having a higher temperature than the cooled EGR gas. The controller controls the EGR introduction system to introduce the hot EGR gas in addition to the cooled EGR gas into the cylinder at least within a low engine load part of the spark-ignition combustion applying range.

Here, "the predetermined first engine load" may be set within a middle engine load part when an entire range of a CI combustion applying range and an SI combustion applying range (except for the throttle valve fully opened range) is divided into three parts of a low engine load part where the engine load is low, a middle engine load part where the engine load is higher than the low engine load part, and a high engine load part where the engine load is higher than the middle engine load part.

Moreover, "the throttle valve fully opened range" means a range where a fresh air ratio with respect to the entire gas amount introduced into the cylinder is 100%, and does not mean a range where, as a result of introducing EGR gas into the cylinder, an intake can be performed while the throttle valve is opened and not while the throttle valve is throttled.

Moreover, "the low-engine load part of the spark-ignition combustion applying range" may be a low-engine load part when the SI combustion applying range (except for the throttle valve fully opened range) is divided into two parts with respect to the level of the engine load.

Furthermore, "the cooled EGR gas" means burned gas that is discharged from inside the cylinder to an exhaust passage and is then aggressively cooled by using, for example, an EGR cooler. "The hot EGR gas" means burned gas that is not aggressively cooled and is higher in temperature than the cooled EGR gas.

According to the above configuration, within the CI combustion applying range, since at least the hot EGR gas is introduced into the cylinder, the temperature inside the cylinder can be increased to improve ignitability even within the low engine load part where the temperature inside the cylinder is difficult to increase. On the other hand, throughout the entire SI combustion applying range (except for the throttle valve fully opened range), since at least the cooled EGR gas is introduced into the cylinder, abnormal combustion especially within the high engine load part can be suppressed by reducing the temperature inside the cylinder.

Additionally, at least within the low engine load part of the SI combustion applying range, since the hot EGR gas is introduced into the cylinder in addition to the cooled EGR gas, a ratio of the EGR gas amount with respect to the entire gas amount can be increased similarly to the CI combustion applying range, for example, even immediately after a high engine load part of the CI combustion applying range where the cooled EGR gas is introduced into the cylinder in addition to the hot EGR gas to suppress a sharp increase of the combustion pressure and is switched to the SI combustion applying range. Thus, a reduction of a pumping loss can be achieved similarly to the CI combustion applying range since the intake can be performed while the throttle valve is opened and not while the throttle valve is throttled.

Moreover, since the ratio of the EGR gas amount with respect to the entire gas amount can be increased by introducing the hot EGR gas into the cylinder in addition to the cooled EGR gas and not by introducing only the cooled EGR gas, unstable combustion due to a large ratio of the EGR gas amount can be suppressed.

According to the above configuration, with the spark-ignition engine where the CI combustion is performed within the low engine load part and the SI combustion is performed within the high engine load part, the unstable combustion can be suppressed while reducing the pumping loss.

Within the spark-ignition combustion applying range, the controller may control the EGR introduction system to reduce the ratio of the EGR gas amount, in some embodiments gradually, with respect to the total amount of gas introduced into the cylinder as the engine load increases, and within the compression self-ignition combustion applying range, the controller may control the EGR introduction system to reduce the EGR gas amount ratio as the engine load increases from at least a second engine load toward the spark-ignition combustion applying range, the second engine load being within the compression self-ignition combustion applying range and lower than the first engine load. Throughout at least a part within the compression self-ignition combustion applying range higher than the second engine load, and the spark-ignition combustion applying range except for the throttle valve fully opened range, the controller may control the EGR introduction system to keep an in-cylinder air-fuel ratio fixed with respect to the fresh air that is reduced due to the EGR gas introduced into the cylinder.

Here, "the second engine load" may be set at a boundary between a low engine load part and a middle engine load part when the CI combustion applying range is divided into the low engine load part where the engine load is low, the middle engine load part where the engine load is higher than the low engine load part, and a high engine load part where the engine load is further higher than the middle engine load part.

Moreover, "from at least the second engine load" means that it includes a mode of reducing the ratio of the EGR gas amount from an engine load smaller than the second engine load.

According to the above configuration, within the low engine load part of the SI combustion applying range, since the ratio of the EGR gas amount increased by introducing the hot EGR gas into the cylinder in addition to the cooled EGR gas is gradually reduced according to the increase of the engine load, in other words, since the amount of EGR gas is not significantly but gradually reduced while keeping a necessary intake air amount according to the increase of the fuel injection amount as well as introducing the EGR gas into the cylinder as much as possible, the reduction of the pumping loss can be achieved while securing the engine torque.

In addition, within the low engine load part of the SI combustion applying range, since the hot EGR gas is introduced into the cylinder even when the ratio of the EGR gas amount is high with respect to the entire gas amount, the combustion can be stabilized without causing an ignition retard and the like. Therefore, unburned HC can be suppressed and emissions can be reduced.

Also within the CI combustion applying range, since the ratio of the EGR gas amount can be gradually reduced according to the increase of the engine load from the second engine load to the SI combustion applying range, the reduction of the pumping loss can be achieved while securing the engine torque.

Here, when the combustion mode is switched from the CI combustion to the SI combustion, generally a torque difference easily occurs. However, according to this configuration, the ratio of the hot EGR gas amount is gradually reduced according to the increase of the engine load within the CI combustion applying range, and the hot EGR gas is introduced into the cylinder continuously in addition to the cooled EGR gas while the EGR gas amount introduced into the cylinder is set to have a fixed in-cylinder air-fuel ratio within the low engine load part of the SI combustion applying range. Therefore, the intake air amount can be gradually increased according to the requested torque while the EGR gas is introduced into the cylinder as much as possible at a switching point of the combustion mode, and thus, the torque difference can be suppressed from being produced when switching from the CI combustion mode to the SI combustion mode.

Within the low engine load part of the spark-ignition combustion applying range, the controller may control the EGR introduction system such that the hot EGR gas is introduced into the cylinder in addition to the cooled EGR gas and a ratio of a hot EGR gas amount with respect to the total amount of gas introduced into the cylinder is gradually reduced as the engine load increases, and within a high engine load part of the spark-ignition combustion applying range, the controller may control the EGR introduction system to only introduce the cooled EGR gas into the cylinder.

The EGR gas introduction into the cylinder within the spark-ignition combustion applying range may be performed through an EGR passage branched from an exhaust passage of the engine and merging with an intake passage. The EGR introduction system may be configured with the EGR passage and a valve, the EGR passage including a main passage provided with an EGR cooler for cooling the exhaust gas and an EGR cooler bypass passage for bypassing the EGR cooler, and the valve controlling EGR gas flow amounts of the EGR cooler bypass passage and the main passage. The valve may be controlled such that the hot EGR gas is introduced into the cylinder via the EGR cooler bypass passage, and the cooled EGR gas is introduced via the main passage.

The controller may control the EGR introduction system such that the ratio of the cooled EGR gas amount with respect to the total amount of gas introduced into the cylinder is gradually increased as the engine load increases from a second engine load within the compression self-ignition combustion applying range and lower than the first load to a third engine load within the spark-ignition combustion applying range and higher than the first engine load, and the cooled EGR gas amount ratio is gradually reduced as the engine load increases within a range above the third engine load.

Here, "the third engine load" is higher than "the predetermined first engine load," and may be set to a low engine load part when the SI combustion applying range (except for the throttle valve fully opened range) is divided into two parts with respect to the engine load.

According to the above configuration, since the cooled EGR gas amount ratio is gradually increased according to the increase of the engine load from the second engine load within the CI combustion applying range to the third engine load within the SI combustion applying range, the in-cylinder temperature within the high engine load part of the CI combustion applying range is decreased, and thus the sharp increase of the combustion pressure can be suppressed, and further, the reduction of the pumping loss can be achieved while suppressing the abnormal combustion within the low engine load part of the SI combustion applying range. Furthermore, within a part of the SI combustion applying range exceeding the third engine load, since the ratio of the cooled EGR gas amount is gradually reduced according to the increase of the engine load, the fresh air amount suitable for the fuel injection amount that increases according to the increase of the engine load can be introduced into the cylinder while the reduction of the pumping loss and the suppression of the abnormal combustion due to the introduction of the EGR gas can be achieved to the throttle valve fully opened range.

The engine may further include a fuel pressure changeable mechanism for changing a pressure of the fuel injected by the fuel injection valve. The controller may control the fuel injection valve to perform an intake stroke injection within a low engine load part of the compression self-ignition combustion applying range. Within a high engine load part of the compression self-ignition combustion applying range and the low engine load part of the spark-ignition combustion applying range, the controller may set the fuel injection pressure of the fuel injection valve to a predetermined pressure of 30 MPa or above by using the fuel pressure changeable mechanism, and may control the fuel injection valve such that a fuel injection start timing before ignition is in a period from a late stage of compression stroke to an early stage of expansion stroke.

Here, "the low engine load part of the compression self-ignition combustion applying range" may be the low engine load part and the middle engine load part when the CI combustion applying range is divided into the low engine load part where the engine load is low, the middle engine load part where the engine load is higher than the low engine load part, and the high engine load part where the engine load is further higher than the middle engine load part as described above, and "the high engine load part of the compression self-ignition combustion applying range" may be the high engine load part of the same three parts of the divided CI combustion range.

According to the above configuration, within the low engine load part of the CI combustion applying range, since the intake stroke injection is performed, in other words, since a mixture gas forming period is long, a vaporization of the fuel mainly containing gasoline is accelerated, and overall homogeneous mixture gas is generated so that the combustion can be stabilized.

On the other hand, within the high engine load part of the CI combustion applying range and the low engine load part of the SI combustion applying range, where the in-cylinder temperature is extremely high, when the intake stroke injection is performed inside the cylinder having a high temperature therein, the fuel is exposed to the high temperature air and the abnormal combustion such as pre-ignition may occur. In order to suppress such an abnormal combustion, decreasing the in-cylinder temperature, for example, by introducing a large amount of cooled EGR gas into the cylinder may seem to be effective; however, by introducing such a large amount of cooled EGR gas into the cylinder, the in-cylinder temperature may decrease too much which may cause unstable combustion.

Thus, in order to stabilize the compression-ignition combustion while avoiding the abnormal combustion such as the pre-ignition, the injection on a later half of the compression stroke is performed at a predetermined pressure of 30 Mpa or above. That is, by retarding the fuel injection start timing to the injection in the latter half of the compression stroke (a period from the late stage of the compression stroke to the early stage of the expansion stroke), the abnormal combustion such as the pre-ignition can be suppressed. Then, in the period from the late stage of the compression stroke to the early stage of the expansion stroke, while a combustion chamber is extremely narrowed because a piston is positioned near a compression top dead center, by injecting the fuel at the high pressure of 30 MPa or above in such a narrow range, a turbulence energy inside the combustion chamber is increased and the vaporization of the fuel mainly containing gasoline is accelerated, and thus, the combustion can be stabilized.

Within the low engine load part of the compression self-ignition combustion applying range, the controller may set the fuel injection pressure of the fuel injection valve to a low fuel pressure of below 30 MPa by using the fuel pressure changeable mechanism.

DETAILED DESCRIPTION OF EMBODIMENTS

Hereinafter, a spark-ignition gasoline engine according to embodiments of the present invention is described in detail with reference to the appended drawings.

(Overall Configuration)

Figure 1:
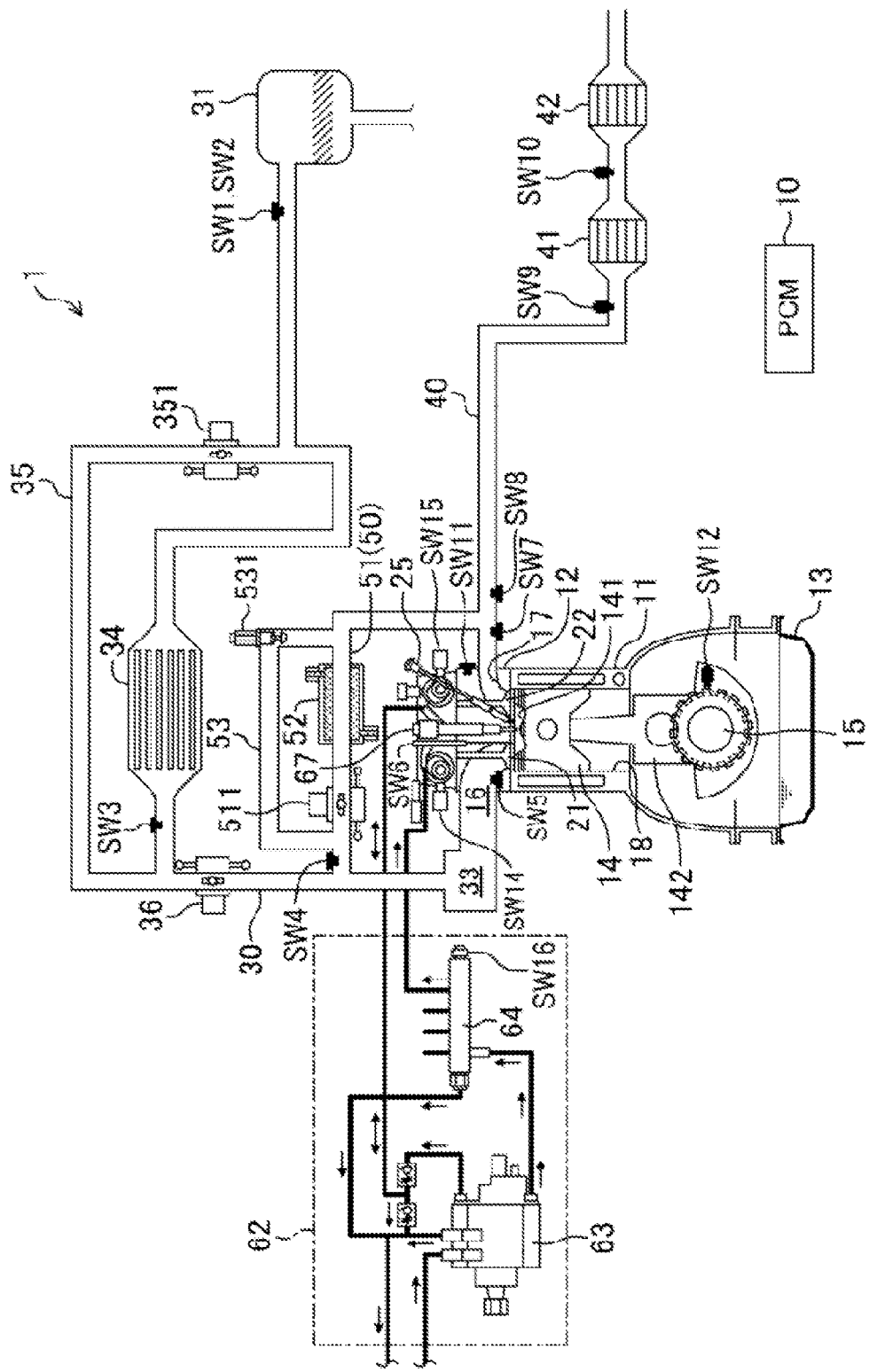
FIG. 1 is a schematic diagram showing a configuration of a spark-ignition gasoline engine of one embodiment of the present invention.
Figure 2:
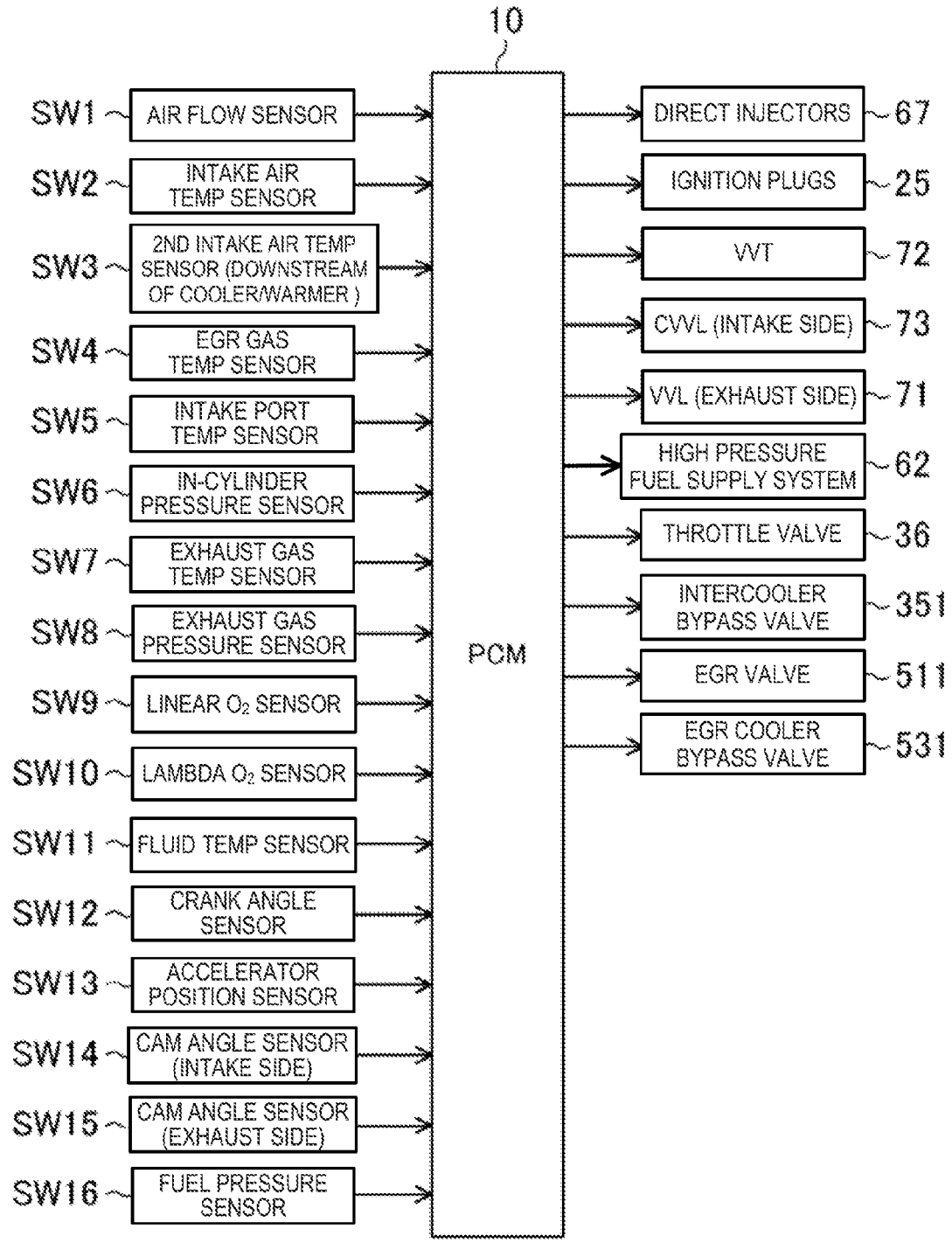
FIG. 2 is a block diagram relating to a control of the spark-ignition gasoline engine.

FIG. 1 is a schematic diagram showing a configuration of a spark-ignition gasoline engine of this embodiment, and FIG. 2 is a block diagram relating to a control of the spark-ignition gasoline engine. The engine 1 (engine body) is a spark-ignition gasoline engine that is equipped in a vehicle and supplied with fuel mainly containing gasoline. The engine 1 includes a cylinder block 11 provided with a plurality of cylinders 18 each forming a combustion chamber 19 in its top part, a cylinder head 12 arranged on the cylinder block 11, and an oil pan 13 arranged below the cylinder block 11 and where a lubricant is stored. Note that, although only one cylinder 18 is illustrated in FIG. 1, here, four cylinders are linearly provided to the cylinder block 11, for example.

Figure 3:
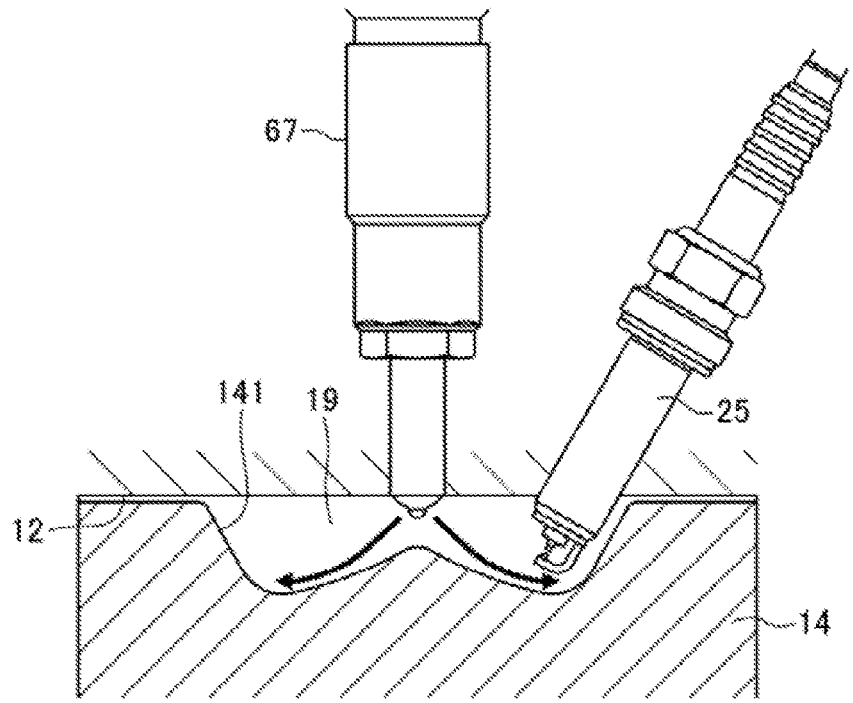
FIG. 3 is a cross-sectional view showing a combustion chamber in an enlarged manner.

Inside the cylinders 18, reciprocating pistons 14 coupled to a crankshaft 15 via connecting rods 142, respectively, are fitted. As shown in FIG. 3 in an enlarged manner, a cavity 141 having a reentrant shape such as the one used in a diesel engine, is formed on a top face of each piston 14. When the piston 14 is at a position near a compression top dead center (CTDC), the cavity 141 faces toward a direct injector 67 described later. The cylinder head 12, the cylinders 18, and the pistons 14 are each formed within the cavity 141 partition combustion chambers 19. Note that, the shape of the combustion chamber 19 is not limited to the shape in the illustration, for example, the shape of the cavity 141, the shape of the top face of the piston 14, and the shape of a ceiling part of the combustion chamber 19 may suitably be changed.

A geometric compression ratio of the engine 1 is set comparatively high as 15:1 or above so as to improve a theoretical thermal efficiency and stabilize compression-ignition combustion (described later). Note that, the geometric compression ratio may suitably be set within a range from 15:1 to about 20:1.

In the cylinder head 12, for each of the cylinders 18, an intake port 16 and an exhaust port 17 are formed, and an intake valve 21 and an exhaust valve 22 are arranged in the intake and exhaust ports 16 and 17 by contact with valve sheets (not illustrated) fixed to circumferential edge portions of intake and exhaust ports on the combustion chamber 19. The intake and exhaust valves 21 and 22 open and close the respective port openings.

Within a valve train system of the engine 1 for operating the intake and exhaust valves 21 and 22, a mechanism such as a hydraulically-actuated variable valve mechanism 71 (hereinafter, may be referred to as the VVL (Variable Valve Lift)) for switching an operation mode of the exhaust valve 22 between a normal mode and a special mode is provided on the exhaust side of the valve train system (see FIG. 2). The VVL 71 (the detailed configuration is not illustrated) is configured to include two kinds of cams with different cam profiles from each other (a first cam having one cam nose and a second cam having two cam noses), and a lost motion mechanism for selectively transmitting an operation state of either one of the first and second cams to the exhaust valve 22.

When the operation state of the first cam is transmitted, the exhaust valve 22 operates in the normal mode where it opens only once during the exhaust stroke. On the other hand, when the operation state of the second cam is transmitted, the exhaust valve 22 operates in the special mode where it opens once during the exhaust stroke and once more during the intake stroke, which is a so called exhaust open-twice control. The normal and special modes are switched therebetween according to an operating state of the engine. Specifically, the special mode is utilized for a control related to an internal EGR. Here, "the internal EGR" means leaving burned gas combusted in the combustion chamber 19 within the cylinder 18, or introducing the burned gas which has flowed out from the combustion chamber 19 to the exhaust port 17, into the cylinder 18 at a high temperature. In this embodiment, the execution of the internal EGR is achieved by the exhaust open-twice control (i.e., introducing the high-temperature burned gas which has flowed out to the exhaust port 17 on the exhaust stroke, into the cylinder 18 by opening the exhaust valve 22 on the intake stroke); however, it is not limited to this and it may be, for example, an internal EGR control by an intake open-twice control where the intake valve 21 is opened twice, or an internal EGR control where burned gas is left in the cylinder 18 by setting a negative overlap period of closing both of the intake and exhaust valves 21 and 22 during the exhaust stroke or the intake stroke.

Note that, hereinafter, the processing of operating the VVL 71 in the normal mode so as not to perform the exhaust open-twice control may be referred to as "turning the VVL 71 off," and the process of operating the VVL 71 in the special mode so as to perform the exhaust open-twice control may be referred to as "turning the VVL 71 on." Additionally, an electromagnetically-operated valve system for operating the exhaust valve 22 by using an electromagnetic actuator may be adopted for switching between the normal and special modes.

Whereas, as shown in FIG. 2, a phase variable mechanism 72 (Variable Valve Timing, hereinafter, may be referred to as the VVT) for changing a rotational phase of an intake camshaft with respect to the crankshaft 15 and a lift variable mechanism 73 (Continuously Variable Valve Lift, hereinafter, may be referred to as the CVVL) for continuously changing a lift of the intake valve 21 are provided on an intake side of the valve train system. A well-known hydraulic, electromagnetic or mechanical structure may suitably be adopted for the VVT 72. Further, various kinds of well-known structures may suitably be adopted for the CVVL 73 (detailed structures thereof are not illustrated). Open and close timings and the lift of the intake valve 21 can be changed by the VVT 72 and the CVVL 73, respectively.

Additionally, in the cylinder head 12, the direct injector 67 (fuel injection valve) for directly injecting the fuel into the combustion chamber 19 is attached to each cylinder 18. As shown in an enlarged manner in FIG. 3, a nozzle hole of the direct injector 67 is arranged in a center part of the ceiling face of the combustion chamber 19 to be oriented toward the inside of the combustion chamber 19. The direct injector 67 directly injects the fuel into the combustion chamber 19 by an amount which is set according to the operating state of the engine 1 at an injection timing which is set according to the operating state of the engine 1. In this embodiment, the direct injector 67 (a detailed configuration is not illustrated) is a multi hole direct injector formed with a plurality of nozzle holes. Thus, the direct injector 67 injects the fuel so that the fuel spray spreads radially from the central position of the combustion chamber 19. As indicated by the arrows in FIG. 3, at a timing corresponding to the piston 14 reaching the position near the CTDC, the fuel spray injected to spread radially from the center part of the combustion chamber 19 flows along a wall surface of the cavity 141 formed on the piston top face. In other words, it may be said that the cavity 141 is formed to contain therewithin the fuel spray injected at the timing corresponding to the piston 14 reaching the position near the CTDC. The combination of the multi hole direct injector 67 and the cavity 141 is advantageous after the fuel is injected, in shortening a mixture gas forming period and the combustion period. Note that, the direct injector 67 is not limited to the multi hole direct injector, and may be an outward opening valve type direct injector.

A fuel supply path is provided to couple a fuel tank (not illustrated) to the direct injectors 67. Within the fuel supply path, a high-pressure fuel supply system 62 (fuel pressure changeable mechanism) is provided, which supplies the fuel to each of the direct injectors 67 at a comparatively high fuel pressure and has a fuel pump 63 and a common rail 64. The fuel pump 63 pumps the fuel from the fuel tank to the common rail 64, and the common rail 64 can accumulate the pumped fuel at a comparatively high fuel pressure. By opening the nozzle holes of the direct injector 67, the fuel accumulated in the common rail 64 is injected from the nozzle holes of the direct injector 67. Here, the fuel pump 63 is a plunger type pump (not illustrated) and is operated by the engine 1. The high-pressure fuel supply system 62 including the engine-operated pump enables the supply of fuel to the direct injector 67 at a high fuel pressure of 30 MPa or above, at a maximum of about 120 MPa. As described later, the pressure of the fuel to be supplied to the direct injector 67 is changed according to the operating state of the engine 1. Note that, the high-pressure fuel supply system 62 is not limited to the above configuration.

Further, in the cylinder head 12, as shown in FIG. 3, an ignition plug 25 for igniting mixture gas inside the combustion chamber 19 is attached for each cylinder 18. In this embodiment, the ignition plug 25 is attached penetrating the cylinder head 12 so that it extends obliquely downward from the exhaust side of the engine 1 and a tip of the ignition plug 25 is oriented toward the inside of the cavity 141 of the piston 14 at the CTDC.

On one side surface of the engine 1, as shown in FIG. 1, an intake passage 30 is connected to communicate with each of the intake ports 16 of the cylinders 18. On the other side of the engine 1, an exhaust passage 40 is connected to lead out the burned gas (exhaust gas) discharged from each of the combustion chambers 19 of the cylinders 18.

An air cleaner 31 for filtrating intake air is arranged in an upstream end part of the intake passage 30, whereas a surge tank 33 is arranged near a downstream end of the intake passage 30. A part of the intake passage 30 downstream of the surge tank 33 is branched to become independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are arranged between the air cleaner 31 and the surge tank 33 in the intake passage 30. Further, an intercooler bypass passage 35 for bypassing the intercooler/warmer 34 is connected within the intake passage 30, and an intercooler bypass valve 351 for adjusting an air flow rate passing through the passage 35 is arranged within the intercooler bypass passage 35. A ratio of a flow rate of the intercooler bypass passage 35 and a flow rate of the intercooler/warmer 34 are adjusted through adjusting an opening of the intercooler bypass valve 351, and thus, a temperature of fresh air to be introduced into the cylinder 18 can be adjusted.

An upstream part of the exhaust passage 40 is constituted with an exhaust manifold having independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylinder case and, for example, a three-way catalyst arranged in a flow passage within the case.

A part of the intake passage 30 between the surge tank 33 and the throttle valve 36 is connected with a part of the exhaust passage 40 on the upstream side of the direct catalyst 41 via an EGR passage 50 for recirculating a part of the exhaust gas to the intake passage 30. The EGR passage 50 includes a main passage 51 arranged with an EGR cooler 52 for cooling the exhaust gas by an engine coolant, and an EGR cooler bypass passage 53 for bypassing the EGR cooler 52. An EGR valve 511 for adjusting a recirculation amount of the exhaust gas to the intake passage 30 is arranged within the main passage 51. An EGR cooler bypass valve 531 for adjusting a flow rate of the exhaust gas flowing through the EGR cooler bypass passage 53 is arranged within the EGR cooler bypass passage 53.

Note that, the execution of the internal EGR of this embodiment is achieved by the exhaust open-twice control, the intake open-twice control, or providing the negative overlap period, whereas the execution of the external EGR of this embodiment is achieved through controlling the EGR valve 511 and the EGR cooler bypass valve 531. Thus, the intake valve 21, the exhaust valve 22, the VVL 71, the VVT 72, the CVVL 73, the EGR passage 50 having the main passage 51 and the EGR cooler bypass passage 53, the EGR cooler 52, the EGR valve 511, and the EGR cooler bypass valve 531 and the like configure the EGR introduction system in the claims which introduces the exhaust gas into the cylinder 18. Note that, the burned gas which is inevitably left/remained within the cylinder by the introduction system for forcibly introducing the EGR gas is excluded from the control described herein.

The diesel engine 1 with the configuration as described above is controlled by a powertrain control module 10 (hereinafter, may be referred to as the PCM). The PCM 10 is configured with a CPU, a memory, a counter timer group, an interface, and a microprocessor with paths for connecting these units. The PCM 10 configures the controller in the claims.

As shown in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air which are arranged on the downstream side of the air cleaner 31; a second intake air temperature sensor SW3 arranged on the downstream side of the intercooler/warmer 34 and for detecting the temperature of the fresh air after passing through the intercooler/warmer 34; an EGR gas temperature sensor SW4 arranged near a connecting part of the EGR passage 50 with the intake passage 30 and for detecting the temperature of external EGR gas; an intake port temperature sensor SW5 attached to the intake port 16 and for detecting a temperature of the intake air immediately before flowing into the cylinder 18; an in-cylinder pressure sensor SW6 attached to the cylinder head 12 and for detecting the pressure inside the cylinder 18; an exhaust gas temperature sensor SW7 and an exhaust gas pressure sensor SW8 arranged near a connecting part of the exhaust passage 40 with the EGR passage 50 and for detecting the exhaust gas temperature and pressure, respectively; a linear $O_2$ sensor SW9 arranged on the upstream side of the direct catalyst 41 and for detecting an oxygen concentration within the exhaust gas; a lambda $O_2$ sensor SW10 arranged between the direct catalyst 41 and the underfoot catalyst 42 and for detecting an oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW15; and a fuel pressure sensor SW16 attached to the common rail 64 of the high-pressure fuel supply system 62 and for detecting the fuel pressure to be supplied to the direct injector 67.

By performing various kinds of operations based on these detection signals, the PCM 10 determines the state of the engine 1, and further the state of the vehicle, and outputs control signals to the direct injectors 67, the ignition plugs 25, the VVT 72 and CVVL 73 on the intake valve 21 side, the VVL 71 on the exhaust valve 22 side, the high-pressure fuel supply system 62, and the actuators of the various kinds of valves (throttle valve 36, intercooler bypass valve 351, the EGR valve 511, and the EGR cooler bypass valve 531) according to the determined state. In this manner, the PCM 10 operates the engine 1.

(Outline of Engine Control)

Figure 4:
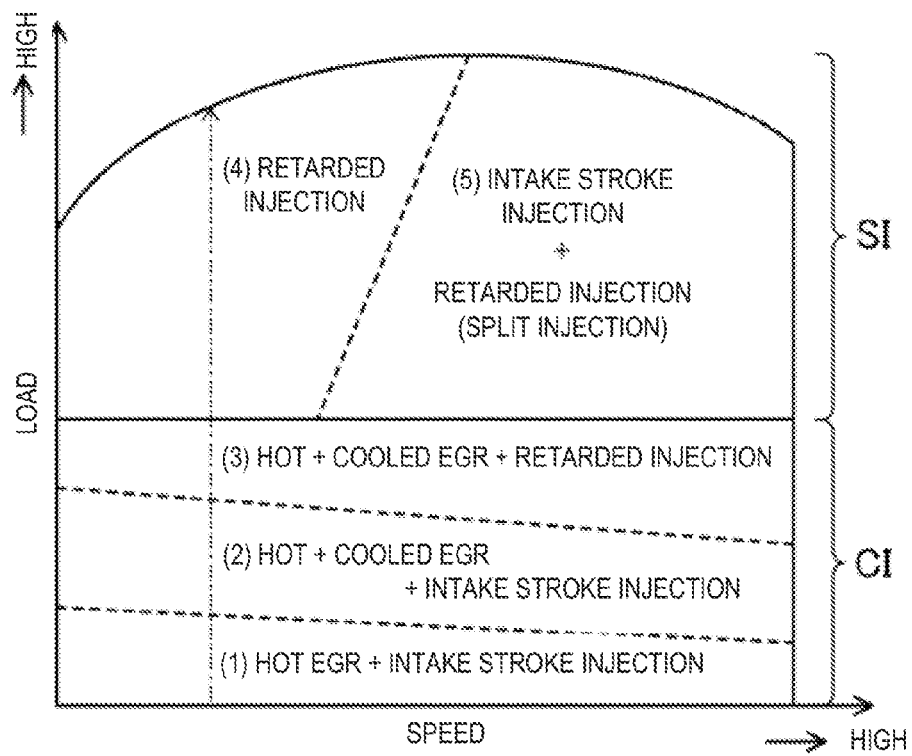
FIG. 4 is a chart exemplifying an operating range of the spark-ignition gasoline engine.

FIG. 4 shows one example of an operating range of the engine. Within a low engine load range where an engine load is relatively low, specifically a lower engine load range than a predetermined first load (predetermined load T5 in the part (a) of FIG. 7), the engine 1 does not perform an ignition by the ignition plug 25 but performs compression-ignition combustion (hereinafter, may be referred to as "CI combustion") in which combustion is generated by a compression self-ignition (Homogeneous Charge Compression Ignition), so as to improve fuel consumption and reduce emissions. However, with the CI combustion, the speed of the combustion becomes excessively rapid as the engine load increases, and thus, may cause a problem of combustion noises, etc. Therefore, with the engine 1, within a high engine load range where the engine load is relatively high, specifically a higher engine load range than the first load, the CI combustion is suspended and is switched to spark-ignition combustion (hereinafter, may be referred to as "SI combustion") caused by a spark-ignition using the ignition plug 25. In other words, the engine 1 switches a combustion mode according to the operating state of the engine 1, particularly the load of the engine 1, between a CI mode where the compression-ignition combustion is performed and an SI mode where the spark-ignition combustion is performed. Note that the boundary line of switching the mode is not limited to the example in the illustration.

Figure 5A:
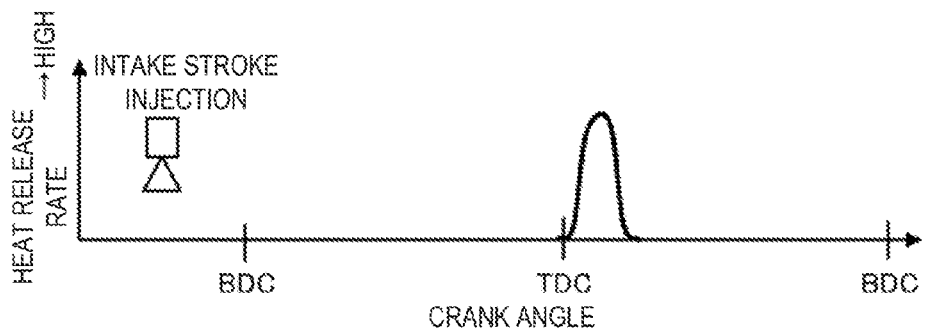
FIG. 5A shows one example of a fuel injection timing in a case where an intake stroke injection is performed within a CI combustion applying range and a heat release rate of a CI combustion accompanied by the intake stroke injection.

The CI mode is divided into three ranges according to the levels of the engine load. Specifically, within a range (1) which is the lowest engine load range in the CI mode, hot EGR gas having a relatively high temperature is introduced into the cylinder 18 to improve the ignitability and stability of the CI combustion. The introduction of the hot EGR gas is achieved by turning the VVL 71 on and performing the exhaust open-twice control of opening the exhaust valve 22 during the intake stroke (described later in detail). Such an introduction of the hot EGR gas increases the temperature inside the cylinder 18 at the CTDC, and is advantageous in improving the ignitability and stability of the CI combustion within the range (1) with a low engine load. Moreover, within the range (1), as shown in FIG. 5A, the direct injector 67 injects the fuel into the cylinder 18 in an intake stroke period, and thus homogeneous lean mixture gas is formed. An air excess ratio λ of the mixture gas may be set to, for example, 2.4:1 or higher (e.g., 2.5:1). Thus, the combustion temperature decreases, and therefore, generation of RawNOx can be suppressed and the exhaust emission performance can be improved. As shown in FIG. 5A, the lean mixture gas is compressed to self-ignite near the CTDC.

Within a part where the engine load is high within the range (1) (range above the predetermined load T1 and below a predetermined load T2 in the part (a) of FIG. 7), even though the fuel is injected into the cylinder 18 in the intake stroke period, the air-fuel ratio of the mixture gas is set to a theoretical air-fuel ratio ($\lambda \approx 1$) (described later in detail). By setting the theoretical air-fuel ratio as described above enables use of a three-way catalyst, the control when switching between the SI and CI modes is simplified (described later), and further, contributes in expanding the CI mode applicable range to the high load range side. Note that, the engine load corresponding to the boundary between the range (1) and the range (2) (the later described predetermined load T2 in the part (a) of FIG. 7) corresponds to the "second load" in the claims.

In the CI mode, within the range (2) where the engine load is higher than the range (1), similar to the higher engine load part of the range (1), the fuel is injected into the cylinder 18 in the intake stroke period (see FIG. 5A), and the homogeneous mixture gas at the theoretical air-fuel ratio ($\lambda \approx 1$) is formed.

Moreover, within the range (2), since the temperature inside the cylinder 18 naturally increases according to the increase of the engine load, the hot EGR gas amount is reduced to avoid pre-ignition. This reduction is achieved by, although it will be described later in detail, adjusting the internal EGR gas amount to be introduced into the cylinder 18. Note that, by adjusting the amount of external EGR gas bypassing the EGR cooler 52, the hot EGR gas amount may be adjusted.

Furthermore, within the range (2), external EGR gas having a relatively low temperature which is cooled mainly through the EGR cooler 52 (cooled EGR gas) is introduced into the cylinder 18 in a manner such that a ratio of an amount of the cooled EGR gas with respect to the entire amount of the gas introduced into the cylinder 18 is increased gradually as the engine load increases. Thus, by introducing the hot EGR gas at a high temperature and the cooled EGR gas at a low temperature into the cylinder 18 at a suitable ratio, the temperature inside the cylinder 18 at the CTDC is adjusted appropriately, a rapid combustion is avoided while securing the ignitability of the compression-ignition, and the compression-ignition combustion is stabilized. Note that, an EGR ratio (a ratio of the EGR gas amount with respect to the total amount of the hot EGR gas and the cooled EGR gas introduced into the cylinder 18) is set as high as possible under the condition that the air fuel ratio of the mixture gas is set to achieve X1. Therefore, within the range (2), the fuel injection amount increases as the engine load increases, and since the intake air amount increases accordingly, the EGR ratio gradually reduces.

Figure 5B:
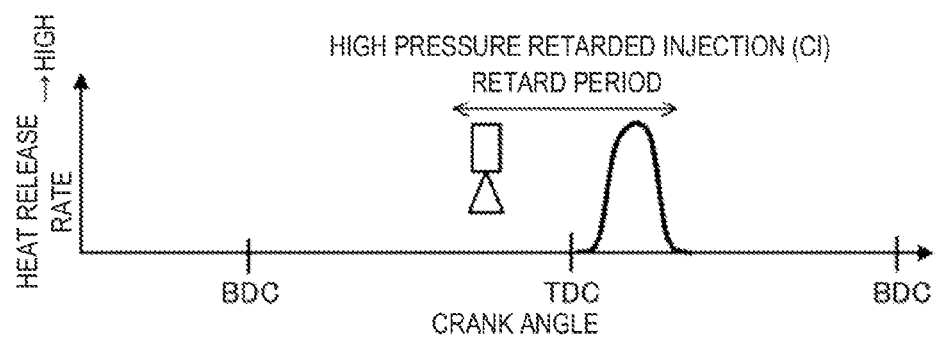
FIG. 5B shows one example of a fuel injection timing in a case where a high pressure retarded injection is performed within the CI combustion applying range and a heat release rate of the CI combustion accompanied by the high pressure retarded injection.

Within a range (3) with the highest engine load in the CI mode which includes a switching boundary between the CI mode and the SI mode, if the fuel is injected into the cylinder 18 in the intake stroke period, it causes abnormal combustion such as pre-ignition. On the other hand, if a large amount of cooled EGR gas is introduced to reduce the temperature inside the cylinder 18 at the CTDC, then the ignitability of the compression-ignition will degrade. In other words, since the compression-ignition combustion cannot be performed stably only by controlling the temperature inside the cylinder 18, within the range (3), by devising the fuel injection mode in addition to the temperature control of the cylinder 18, the compression-ignition combustion can be stabilized while avoiding the abnormal combustion, such as pre-ignition. Specifically, in the fuel injection mode, as shown in FIG. 5B, the fuel is injected into the cylinder 18 in a period between the late stage of the compression stroke and the early stage of the expansion stroke (compression stroke later injection) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (3). The details of the high pressure retarded injection will be described later.

Within the range (3), the air-fuel ratio of the mixture gas is set to the theoretical air-fuel ratio ($\lambda \approx 1$) similarly to the range (2). Since the theoretical air-fuel ratio enables use of a three-way catalyst, it is advantageous in improving the emission performance. Moreover, within the range (3), the hot EGR gas amount is reduced as the engine load increases so as to avoid pre-ignition, whereas the cooled EGR gas amount is increased, so that the high-temperature hot EGR gas and the low-temperature cooled EGR gas are introduced into the cylinder 18 at a suitable ratio. Thus, the temperature inside the cylinder 18 at the CTDC is adjusted appropriately and the compression-ignition combustion is stabilized. Note that, an EGR ratio (a ratio of the EGR gas amount with respect to the total amount of hot EGR gas and the cooled EGR gas introduced into the cylinder 18) is set as high as possible under the condition that the air fuel ratio of the mixture gas is set to achieve $\lambda \approx 1$. Therefore, within the range (3), the fuel injection amount increases as the engine load increases, and since the intake air amount increases accordingly, the EGR ratio gradually reduces.

As described above, throughout the whole CI combustion applying range (CI mode), the hot EGR gas is introduced into the cylinder 18. Thus, even within a low engine load part of the CI combustion applying range where the temperature inside the cylinder 18 is difficult to increase, the temperature inside the cylinder 18 can be increased to improve the ignitability. Moreover, since the ratio of the cooled EGR gas amount with respect to the amount of the total gas introduced into the cylinder 18 is gradually increased as the engine load increases from the second load toward the SI combustion applying range, the temperature inside the cylinder 18 within the high engine load part of the CI combustion applying range can be reduced to suppress a sharp increase of the combustion pressure. The air excess ratio $\lambda$ of the mixture gas within the cylinder 18 is set to 2.4:1 or higher within a low engine load part of the range (1), whereas the air excess ratio $\lambda$ of the mixture gas is set to the theoretical air-fuel ratio ($\lambda \approx 1$) within a high engine load part of the range (1), and the ranges (2) and (3) (at least between the second load and a maximum load of the range (3)). Thus, the ratio of the cooled EGR gas amount with respect to the amount of the total gas introduced into the cylinder 18 is gradually reduced as the engine load increase from the second load to the SI combustion applying range. Therefore, the pumping loss can be reduced while securing the engine torque. Moreover, since the generation of Raw-NOx itself is suppressed within the low engine load part of the range (1) by setting the air excess ratio $\lambda$ as above, and the three-way catalyst can be used within the high engine load part of the range (1), and the ranges (2) and (3), emissions can be reduced.

While the CI mode has three divided ranges according to the engine load, the SI mode is divided into two ranges (4) and (5) according to the level of the engine speed. When the operating range of the engine 1 is divided into two of higher and lower speed ranges, in FIG. 4, the range (4) corresponds to the lower engine speed range and the range (5) corresponds to the higher engine speed range. Moreover, although in the operating ranges shown in FIG. 4, the boundary between the ranges (4) and (5) extending with respect to the engine load is inclined in the engine speed direction; the boundary is not limited to the illustrated example.

In each of the ranges (4) and (5), the mixture gas is set to the theoretical air-fuel ratio ($\lambda \approx 1$) similarly to the ranges (2) and (3). Therefore, the air-fuel ratio of the mixture gas is fixed at the theoretical air-fuel ratio ($\lambda \approx 1$) over the boundary between the CI mode and the SI mode, and this enables use of a three-way catalyst. Moreover, within the ranges (4) and (5), although it is described later in detail, the throttle valve 36 is basically fully opened and the fresh air amount and the external EGR gas amount to be introduced into the cylinder 18 are adjusted by the opening adjustment of the EGR valve 511. More specifically, since the ratio of the cooled EGR gas amount with respect to the amount of the total gas introduced into the cylinder 18 is gradually reduced as the engine load increases. By such gradual reduction, in other words, since the ratio of the EGR gas amount is not significantly reduced but gradually reduced while introducing the EGR gas as much as possible as well as securing the intake air amount required as the fuel injection amount increases, the pumping loss can be reduced while securing the engine torque. Also, since the large amount of EGR gas is introduced into the cylinder 18, the temperature of the spark-ignition combustion is suppressed low and a cooling loss can be reduced. Within the ranges (4) and (5), the cooled EGR gas is introduced into the cylinder 18 throughout the whole range except for a full engine load range. Furthermore specifically, within the ranges (4) and (5), the cooled EGR gas amount is gradually increased as the engine load increases to a third load (later described as predetermined load T6 in the part (a) of FIG. 7), whereas the cooled EGR gas amount is gradually reduced as the engine load increases from the third load. Thus, it becomes advantageous to avoid the abnormal combustion as well as to suppress the generation of RawNOx. Additionally, within the ranges (4) and (5), by adjusting the external EGR gas amount bypassing the EGR cooler 52, the hot EGR gas is introduced into the cylinder 18 until the third load (described later in detail). Note that, within the full engine load range, the EGR valve 511 is fully closed to cancel the external EGR.

Figure 13:
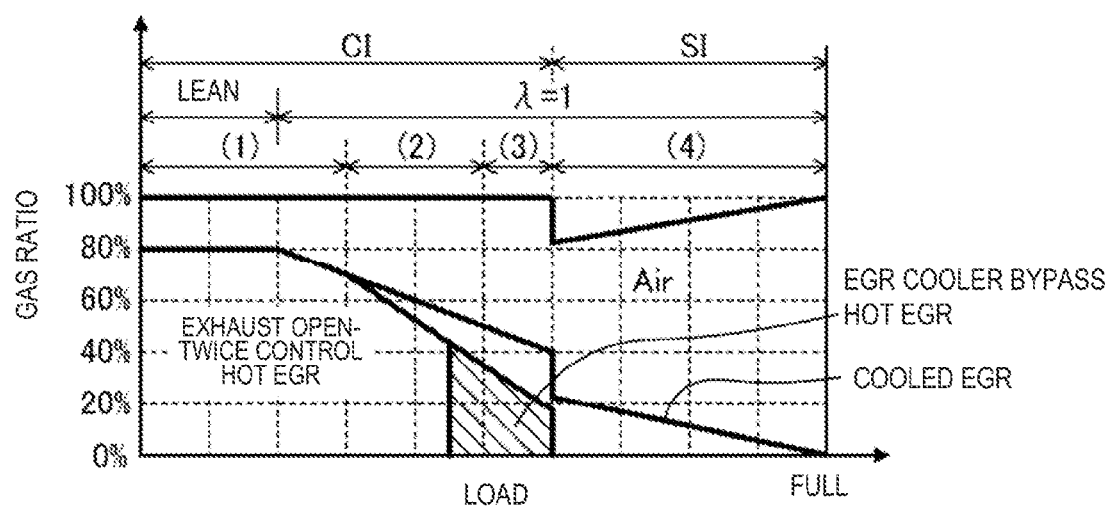
FIG. 13 is a chart showing a gas composition inside the cylinder with respect to the difference in engine loads when the hot EGR gas is not introduced in the SI mode.

Here, in the CI mode, within the low engine load range therein (e.g., range (1)), since the ignitability is required to be improved, a large amount of the hot EGR gas can be introduced into the cylinder 18. Moreover, within the high engine load range therein (e.g., ranges (2) and (3)), since the cooled EGR gas is also introduced into the cylinder 18 in addition to the hot EGR gas, as a result, a large amount of EGR gas can be introduced into the cylinder 18. In other words, in the CI mode, since the cylinder 18 can be filled with the large amount of EGR gas, the intake can be performed while the throttle valve 36 is basically opened and not while the throttle valve 36 is throttled, and therefore, the pumping loss can effectively be reduced. On the other hand, in the SI mode, the ignitability needs to be secured while suppressing abnormal combustion. Therefore, since the amount of the cooled EGR gas that can be introduced into the cylinder 18 is restricted, in other words, the amount of the EGR gas that can be introduced into the cylinder 18 is restricted by the in-cylinder temperature, if the air-fuel ratio is fixed to the theoretical air-fuel ratio ($\lambda \approx 1$), as shown in FIG. 13, the total gas amount introduced into the cylinder 18 needs to be reduced by throttling the throttle valve 36, and there is a problem that the pumping loss reduction similar to the CI mode is difficult to be achieved. When the amount of the cooled EGR gas introduced into the cylinder 18 is increased to reduce the pumping loss similarly to the CI mode, the in-cylinder temperature decreases excessively, mainly within the low engine load range, causing unstable ignitability and combustibility.

Therefore, with the engine 1, as described above, at least within the low engine load parts of the ranges (4) and (5), the hot EGR gas is introduced into the cylinder in addition to the cooled EGR gas. Due to introducing the hot EGR gas in addition to the cooled EGR gas, the ratio of the EGR gas amount with respect to the total gas amount can be increased similarly to the CI mode from the range (3) where the cooled EGR gas is introduced into the cylinder in addition to the hot EGR gas to suppress the sharp increase of the combustion pressure, to even immediately after the combustion mode is switched to the SI mode. Thus, the intake can be performed while the throttle valve 36 is opened and not while the throttle valve 36 is throttled, and therefore, the pumping loss can effectively be reduced similarly to the CI mode. Additionally, since the ratio of the EGR gas amount is not increased only by the cooled EGR gas, but by introducing the hot EGR gas into the cylinder in addition to the cooled EGR gas, combustion unstabilization due to the ratio of the EGR gas amount being high can be suppressed.

Moreover, the geometric compression ratio of the engine 1 is, as described above, set to 15:1 or above (e.g., 18:1). Since a high compression ratio increases the in-cylinder temperature and the in-cylinder pressure at the CTDC, it is advantageous in stabilizing the compression-ignition combustion in the CI mode, especially in the low engine load range of the CI mode (e.g., the range (1)). Whereas, in the SI mode that is the high engine load range, this high compression ratio engine 1 causes a problem that the abnormal combustion (e.g., preignition and knocking) easily occurs.

Figure 5C:
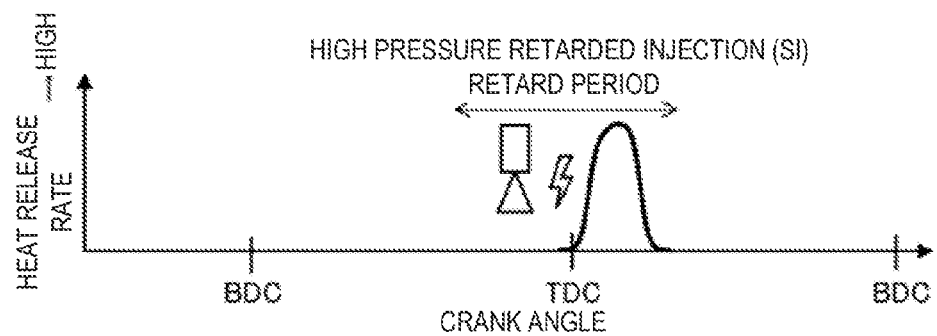
FIG. 5C shows one example of a fuel injection timing and an ignition timing in a case where a high pressure retarded injection is performed within an SI combustion applying range and a heat release rate of the SI combustion accompanied by the high pressure retarded injection.
Figure 5D:
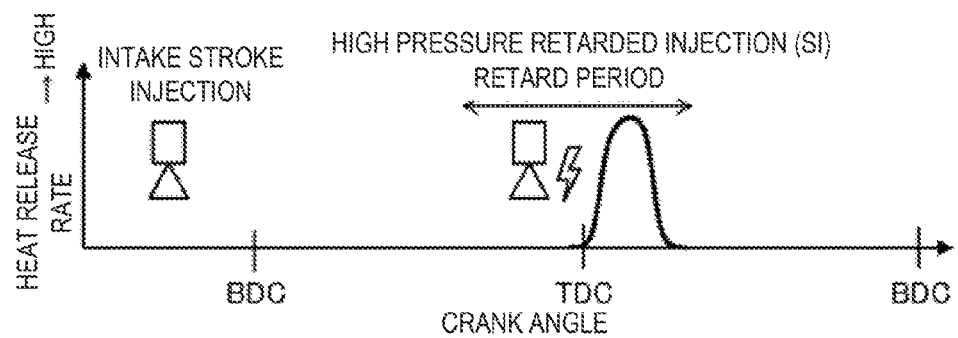
FIG. 5D shows one example of a fuel injection timing and the ignition timing in a case where split injections of the intake stroke injection and the high pressure retarded injection are performed within the SI combustion applying range, and a heat release rate of the SI combustion accompanied by the split injections.

Thus, with the engine 1, the high pressure retarded injection is performed within the ranges (4) and (5) of the SI mode to avoid the abnormal combustion. Specifically, within the range (4), at a high fuel pressure of 30 MPa or above, as shown in FIG. 5C, only the high pressure retarded injection is performed, in which the fuel is injected into the cylinder 18 in the retard period between the late stage of the compression stroke and the early stage of the expansion stroke. On the other hand, within the range (5), as shown in FIG. 5D, a part of the fuel for injection is injected into the cylinder 18 in an intake stroke period where the intake valve 21 is opened, and the rest of the fuel for the injection is injected into the cylinder 18 within the retard period. In other words, within the range (5), a split injection of fuel is performed. Here, the intake stroke period where the intake valve 21 is opened is a period defined based on open and close timings of the intake valve 21, and not a period defined based on the piston position. Here, the end of the intake stroke may vary with respect to the timing at which the piston 14 reaches an intake bottom dead center (IBDC) depending on the close timing of the intake valve 21 which is changed by the CVVL 73 and the VVT 72.

Next, the high pressure retarded injection in the SI mode is described with reference to FIG. 6, which shows charts comparing differences in a heat release rate (upper chart) and an extent of reaction of unburned mixture gas (lower chart) between an SI combustion caused by the high pressure retarded injection described above (solid line) and the conventional SI combustion in which the fuel injection is performed during the intake stroke (broken line). The lateral axis in FIG. 6 indicates the crank angle. The comparison is performed under a condition that the operating state of the engine 1 is within the lower engine speed range with high engine load (i.e., the range (4)), and a fuel amount to be injected is the same between the SI combustion caused by the high pressure retarded injection and the conventional SI combustion.

First, for the conventional SI combustion, a predetermined amount of fuel is injected into the cylinder 18 during the intake stroke (broken line in the upper chart). After the fuel is injected, comparatively homogeneous mixture gas is formed inside the cylinder 18 before the piston 14 reaches the CTDC. Further, in this case, the ignition is performed at a predetermined timing indicated by the first white circle after the CTDC, and then the combustion starts. After the combustion starts, as indicated by the broken line in the upper chart of FIG. 6, the combustion ends after progressing through a peak of the heat release rate. A period from the start of the fuel injection until the end of the combustion corresponds to a reactable time length of unburned mixture gas (hereinafter, may simply be referred to as the reactable time length) and, as indicated by the broken line in the lower chart of FIG. 6, the reaction of the unburned mixture gas gradually progresses within the reactable time length. The dotted line in the lower chart indicates an ignition threshold (i.e., a reactivity of the unburned mixture gas being ignited). The conventional SI combustion has, in combination with within the low engine speed range, an extremely long reactable time length, and the reaction of the unburned mixture gas keeps progressing for the reactable time length, and therefore, the reactivity of the unburned mixture gas exceeds the ignition threshold around the ignition timing, causing the abnormal combustion such as pre-ignition and knocking On the other hand, the high pressure retarded injection aims to avoid the abnormal combustion by shortening the reactable time length. As shown in FIG. 6, the reactable time length in this case is a total time length of a period where the direct injector 67 injects the fuel ((1) an injection period), a period from the end of the injection until combustible mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection periods, the mixture gas forming period, and the combustion period, and thereby, shortens the reactable time length. The methods of shortening the periods are explained sequentially.

First, a high fuel pressure relatively increases the fuel injection amount injected from the direct injector 67 per unit time. Therefore, in a case where the fuel injection amount is fixed, a relation between the fuel pressure and the injection period of the fuel substantially becomes as follows: the injection period extends as the fuel pressure decreases, and the injection period contracts as the fuel pressure increases. Therefore, the high pressure retarded injection in which the fuel pressure is set significantly higher than the conventional pressure shortens the injection period.

Further, the high fuel pressure is advantageous in atomizing the fuel spray injected into the cylinder 18 and further extends a spreading distance of the fuel spray. Therefore, a relation between the fuel pressure and a fuel vaporization time length substantially becomes as follows: the fuel vaporization time length extends as the fuel pressure decreases, and the fuel vaporization time length contracts as the fuel pressure increases. Further, a relation between the fuel pressure and a time length for the fuel spray to reach around the ignition plug 25 (the fuel spray reaching time length) substantially becomes as follows: the fuel spray reaching time length extends as the fuel pressure decreases, and the fuel spray reaching time length contracts as the fuel pressure increases. The mixture gas forming period corresponds to a total time length of the fuel vaporization time length and the fuel spray reaching time length to around the ignition plug 25; therefore, the mixture gas forming period contracts as the fuel pressure increases. Therefore, the high pressure retarded injection in which the fuel pressure is set significantly higher than the conventional pressure shortens the fuel vaporization time length and the fuel spray reaching time length to around the ignition plug 25 and, as a result, shortens the mixture gas forming period. On the other hand, as indicated by the white circle of the chart in FIG. 6, with the conventional intake stroke injection with the low fuel pressure, the mixture gas forming period is significantly longer. Note that, the combination of the multi hole direct injector 67 and the cavity 141 shortens the time length from the end of the fuel injection until when the fuel spray reaches around the ignition plug 25 and, as a result, becomes advantageous in shortening the mixture gas forming period.

As described above, shortening the injection period and the mixture gas forming period enables to retard the injection timing of the fuel, more precisely, retard the injection start timing to a comparatively late timing. Therefore, as shown in the upper chart of FIG. 6, with the high pressure retarded injection, the fuel injection is performed within the retard period between the late stage of the compression stroke and the early stage of the expansion stroke. Due to injecting the fuel into the cylinder 18 at the high fuel pressure, the turbulence of the flow inside the cylinder 18 becomes stronger and a turbulence kinetic energy inside the cylinder 18 increases. The high turbulence kinetic energy is, in combination with retarding the fuel injection timing to the comparatively late timing, advantageous in shortening the combustion period.

In other words, in a case where the fuel injection is performed within the retard period, a relation between the fuel pressure and the turbulence kinetic energy within the combustion period substantially becomes as follows: the turbulence kinetic energy decreases as the fuel pressure decreases, and the turbulence kinetic energy increases as the fuel pressure increases. Here, even if the fuel is injected into the combustion chamber 19 at the high fuel pressure, in the case where the injection timing is on the intake stroke, due to the time length until the ignition timing being long and inside the cylinder 18 being compressed on the compression stroke after the intake stroke, the turbulence inside the cylinder 18 is subsided. As a result, in the case where the fuel injection is performed during the intake stroke, the turbulence kinetic energy within the combustion period becomes comparatively low regardless of the fuel pressure.

A relation between the turbulence kinetic energy within the combustion period and the combustion period substantially becomes as follows: the combustion period extends as the turbulence kinetic energy decreases and the combustion period contracts as the turbulence kinetic energy increases. Therefore, a relation between the fuel pressure and the combustion period becomes as follows: the combustion period extends as the fuel pressure decreases and the combustion period contracts as the fuel pressure increases. In other words, the high pressure retarded injection shortens the combustion period. On the other hand, with the conventional intake stroke injection with the low fuel pressure, the combustion period extends. Note that, the multi hole direct injector 67 is advantageous in increasing the turbulence kinetic energy inside the cylinder 18 and shortening the combustion period. Moreover, it is also advantageous in shortening the combustion period to keep the fuel spray contained within the cavity 141 by the combination of the multi hole direct injector 67 and the cavity 141.

Figure 6:
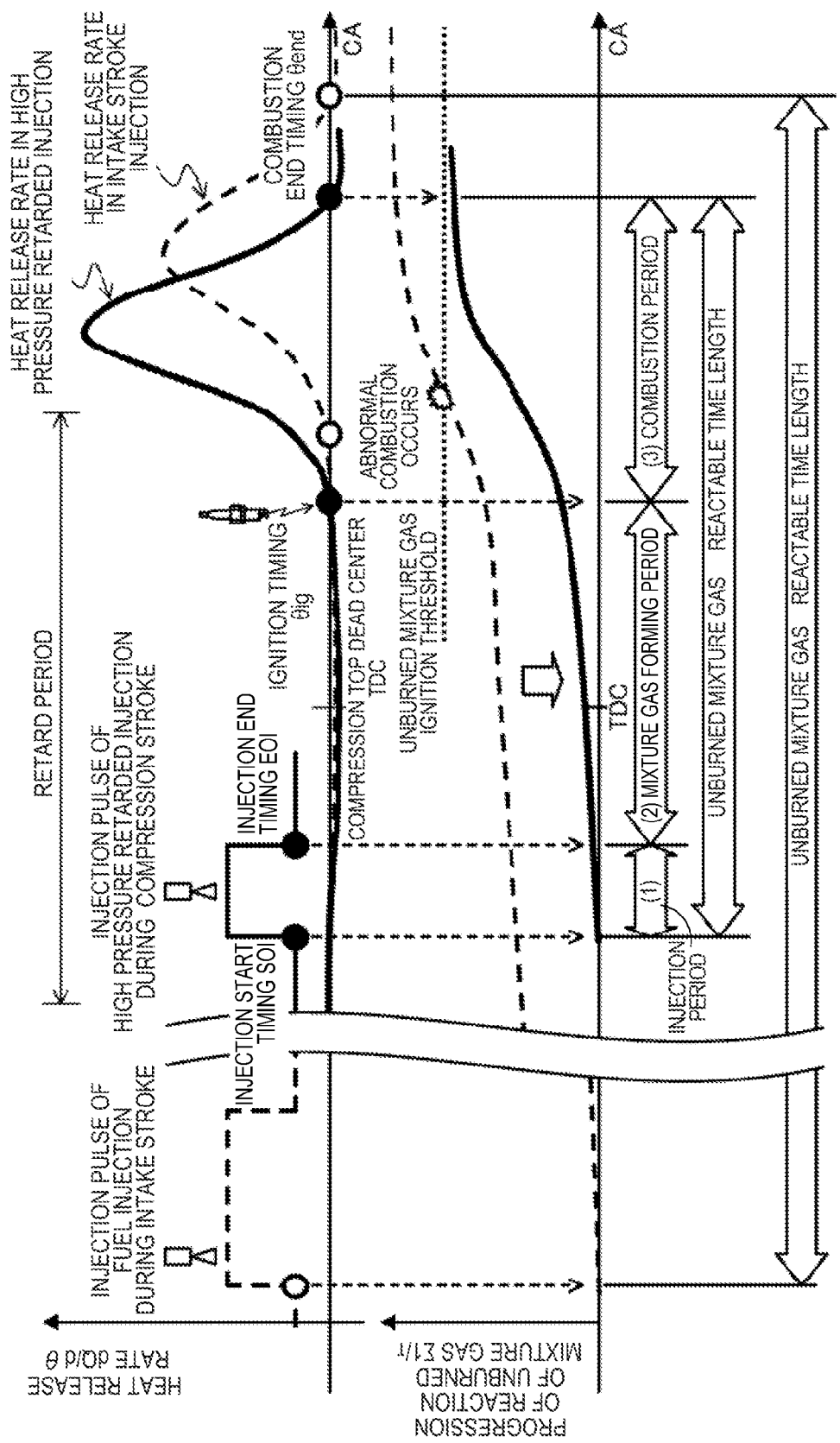
FIG. 6 shows charts a comparison between an SI combustion caused by the high pressure retarded injection and the conventional SI combustion.

As described above, the high pressure retarded injection shortens each of the injection periods, the mixture gas forming period, and the combustion period, and as a result, as shown in FIG. 6, the high pressure retarded injection can significantly shorten the reactable time length of the unburned mixture gas from a fuel injection start timing SOI to a combustion end timing θend compared to the conventional case where the fuel injection is performed during the intake stroke. As a result of shortening the reactable time length, as shown in the upper chart of FIG. 6, while the extent of the reaction of the unburned mixture gas at the end of the combustion exceeds the ignition threshold and the abnormal combustion occurs with the conventional intake stroke injection with the low fuel pressure as indicated by the white circle, with the high pressure retarded injection, as indicated by the black circle, the progression of the reaction of the unburned mixture gas at the end of the combustion is suppressed and the abnormal combustion can be avoided. Note that, the ignition timings for cases indicated by the white and black circles in the upper chart of FIG. 6 are set to be the same timing.

By setting the fuel pressure to, for example, 30 MPa or above, the combustion period can effectively be shortened. Moreover, the fuel pressure of 30 MPa or above can effectively shorten the injection period and also the mixture gas forming period. Note that, the fuel pressure may be suitably set according to a type of fuel to be used which mainly contains gasoline. The upper limit value of the fuel pressure may be 120 MPa, etc.

The high pressure retarded injection avoids the occurrence of abnormal combustion in the SI mode by devising the mode of the fuel injection into the cylinder 18. Other than such a high pressure retarded injection, it has conventionally been known to avoid the abnormal combustion by retarding the ignition timing. The retarded ignition timing suppresses the increases of the temperature and pressure of the unburned mixture gas and, thereby, suppresses the progression of the reaction of the unburned mixture gas. However, while the retarded ignition timing causes degradation of the thermal efficiency and reduction of the torque, when the high pressure retarded injection is performed, since the abnormal combustion is avoided by devising the mode of the fuel injection, the ignition timing can be advanced, and thus, the thermal efficiency can be improved and the torque can be increased. In other words, the high pressure retarded injection can, not only avoid the abnormal combustion, but also enable to advance the ignition timing accordingly, and thereby, it is advantageous in improving the fuel consumption.

As described above, the high pressure retarded injection in the SI mode can shorten each of the injection periods, the mixture gas forming period, and the combustion period, while the high pressure retarded injection performed within the range (3) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel is injected at the late timing near the CTDC, the comparatively homogeneous mixture gas can swiftly be formed.

In the high pressure retarded injection in the CI mode, by injecting the fuel at the late timing near the CTDC within the comparatively high engine load range, substantially homogeneous mixture gas is swiftly formed as described above while preventing pre-ignition in, for example, a compression stroke period. Therefore, after the CTDC, the compression ignition can surely be performed. Further, by performing the compression-ignition combustion in an expansion stroke period where the pressure inside the cylinder 18 decreases due to the motoring, the combustion subsides, and excessive increase of the pressure (dP/dt) inside the cylinder 18 due to the compression-ignition combustion can be avoided. Thus, the restriction of NVH is released and, as a result, the range of the CI mode applicable range extends to the high load range side.

Back to the SI mode, as described above, the high pressure retarded injection in the SI mode shortens the reactable time length of the unburned mixture gas by performing the fuel injection in the retard period; however, although the shortening of the reactable time length is advantageous within the low engine speed range where the engine speed is comparatively low because the actual reactable time length against the crank angle change is long, within the high engine speed range where the engine speed is comparatively high, since the actual reactable time length against the crank angle change is short, it is less advantageous. On the other hand, with the retarded injection, since the fuel injection timing is set to near the CTDC, on the compression stroke, the in-cylinder gas that does not include the fuel, in other words, air at a high specific heat ratio is compressed. As a result, within the high engine speed range, the temperature inside the cylinder 18 at the CTDC increases, and this increased temperature at the CTDC causes knocking. Therefore, when only performing the retarded injection within the range (5), there may be a case where it is required to retard the ignition timing to avoid knocking.

Therefore, within the range (5) where the engine speed is relatively high in the SI mode as shown in FIG. 4, a part of the fuel for injection is injected into the cylinder 18 in the intake stroke period, and the rest of the fuel for the injection is injected into the cylinder 18 in the retard period, as shown in FIG. 5D. With the intake stroke injection, the specific heat ratio of the in-cylinder gas on the compression stroke (i.e., the mixture gas including the fuel) may be reduced to suppress the in-cylinder temperature at the CTDC. By decreasing the in-cylinder temperature at the CTDC as above, knocking can be suppressed and, therefore, the ignition timing can be advanced.

Moreover, by performing the high pressure retarded injection, as described above, the turbulence inside the cylinder 18 (in the combustion chamber 19) near the CTDC becomes strong, and the combustion period becomes shorter. This shorter combustion period is also advantageous in suppressing knocking, and the ignition timing can further be advanced. Thus, within the range (5), by performing the split injection including the intake stroke injection and the high pressure retarded injection, the thermal efficiency can be improved while avoiding the abnormal combustion.

Note that, instead of performing the high pressure retarded injection, a multi-point ignition system may be adopted to shorten the combustion period within the range (5). Specifically, a plurality of ignition plugs is arranged to be oriented toward the inside of the combustion chamber 19, and within the range (5), the intake stroke injection is performed as well as each of the plurality of ignition plugs is controlled to perform a multi-point ignition. In this case, since a flame spreads from each of the plurality of fire sources inside the combustion chamber 19, the flame spreads rapidly and the combustion period becomes shorter. As a result, the combustion period is shortened, similarly to when the high pressure retarded injection is implemented, and this shortened combustion period is advantageous in improving the thermal efficiency.

(Specific Control Procedure)

FIGS. 7 to 10 show examples of each parameter of the engine 1 with respect to the level of the engine load within the low engine speed range. The change of the engine load from low to high is illustrated in the operation map of the engine shown in FIG. 4, using the dashed-line arrow.

Figure 7:
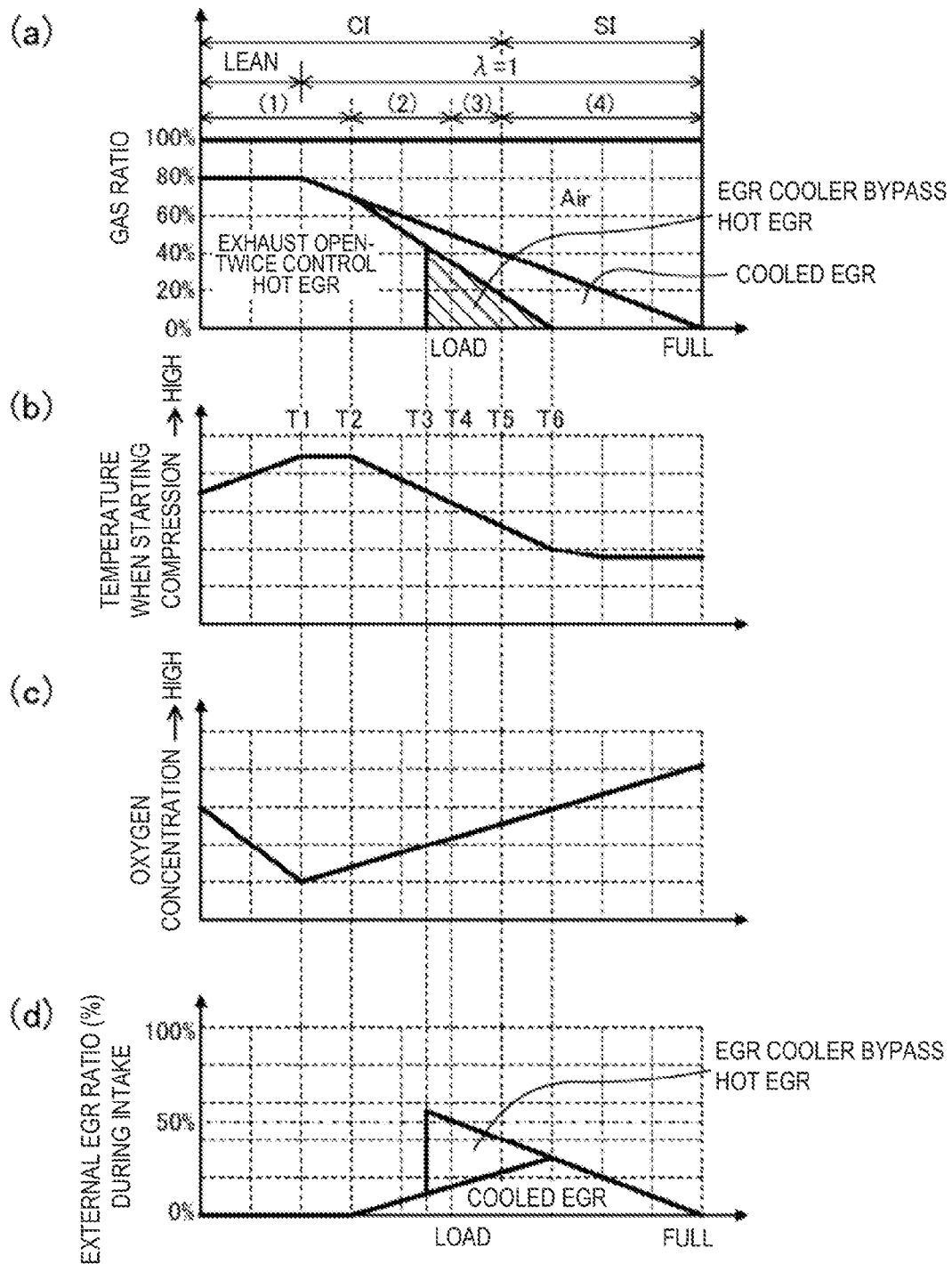
FIG. 7 shows changes in states inside a cylinder with respect to the engine loads, in which the part (a) shows a gas composition inside the cylinder, the part (b) shows the temperature inside the cylinder when starting a compression, the part (c) shows an oxygen concentration, and the part (d) shows an external EGR ratio of during the intake.

The parts (a) to (d) of FIG. 7 illustrate the state inside the cylinder 18, in which the part (a) shows a gas composition (gas ratio) inside the cylinder 18, the part (b) shows the temperature inside the cylinder 18 when starting the compression, and the part (c) shows an oxygen concentration. Moreover, the part (d) of FIG. 7 shows the external EGR ratio during the intake. The external EGR gas can be said to correspond to the amount obtained by excluding the internal EGR gas from the EGR gas introduced into the cylinder 18.

Figure 8:
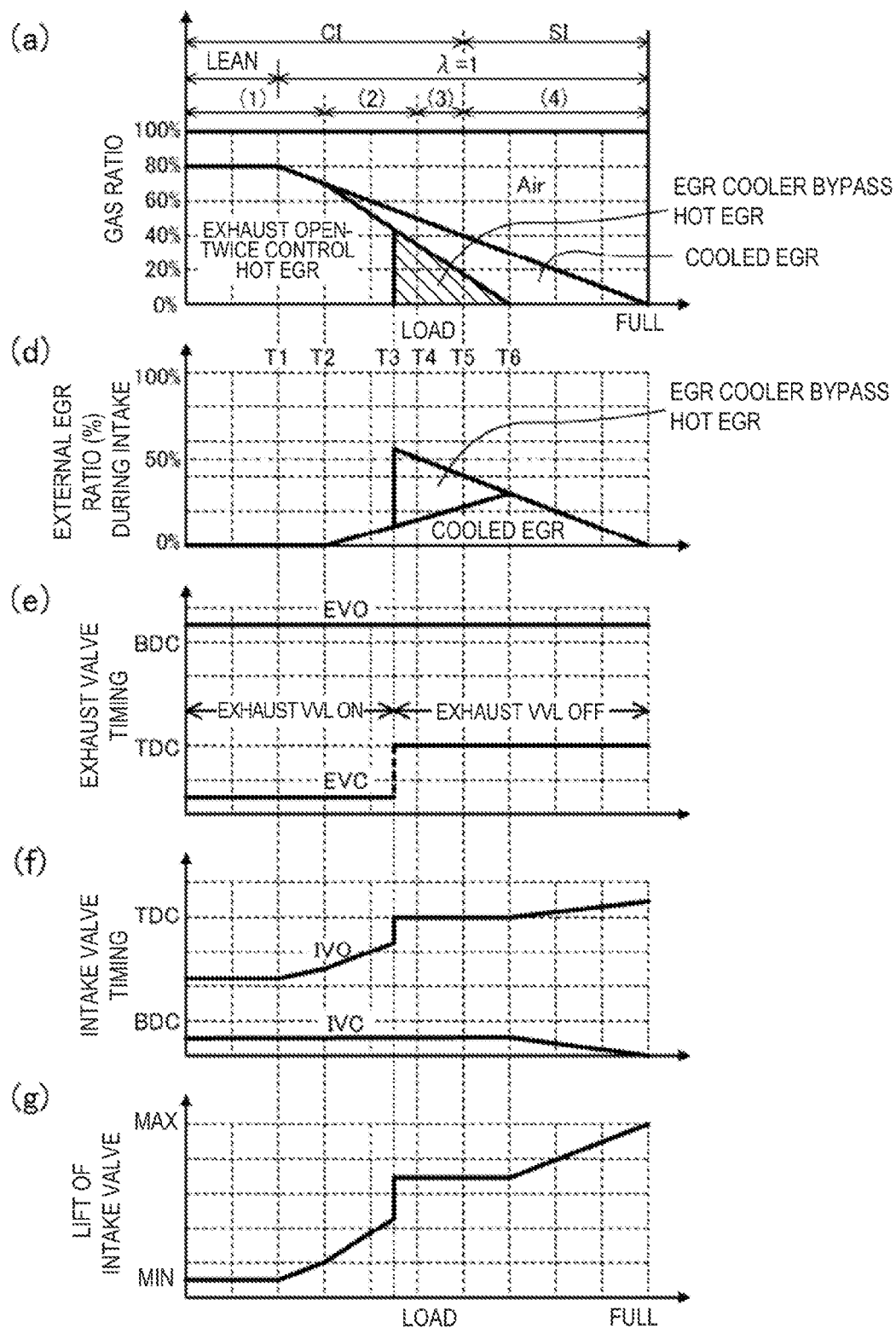
FIG. 8 shows changes in states inside the cylinder with respect to the engine loads, in which the part (a) shows a gas composition inside the cylinder, the part (d) shows the external EGR ratio of during the intake, the part (e) shows the open and close timings of the exhaust valve, the part (f) shows the open and close timings of the intake valve, and the part (g) shows the lift of the intake valve.

The parts (a) and (d) of FIG. 8 are the same as the parts (a) and (d) of FIG. 7, showing the gas composition inside the cylinder 18 and the external EGR ratio of during the intake, respectively. Moreover, the parts (e) to (g) of FIG. 8 illustrate the control of the valve train system, in which the part (e) shows the open and close timings of the exhaust valve 22, the part (f) shows the open and close timings of the intake valve 21, and the part (g) shows the lift of the intake valve 21.

Figure 9:
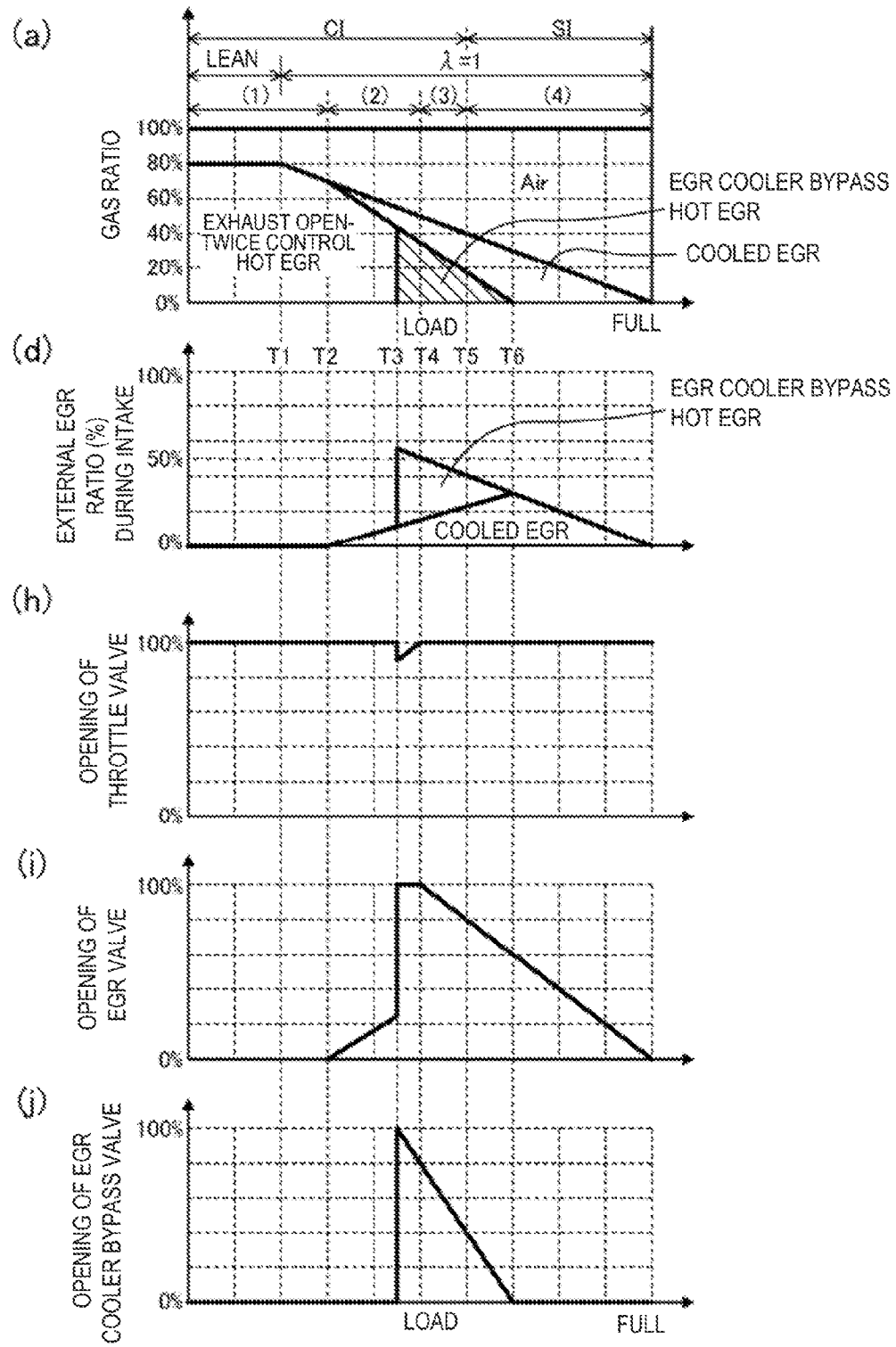
FIG. 9 shows changes in states inside the cylinder with respect to the engine loads, in which the part (a) shows the gas composition inside the cylinder, the part (d) shows the external EGR ratio of during the intake, the part (h) shows the opening of the throttle valve, the part (i) shows the opening of the EGR valve, and the part (j) shows the opening of the EGR cooler bypass valve.

The parts (a) and (d) of FIG. 9 are the same as the parts (a) and (d) of FIG. 7. Moreover, the parts (h) to (j) of FIG. 9 illustrate the control of the intake and exhaust systems, in which the part (h) shows the opening of the throttle valve 36, the part (i) shows the opening of the EGR valve 511, and the part (j) shows the opening of the EGR cooler bypass valve 531.

Figure 10:
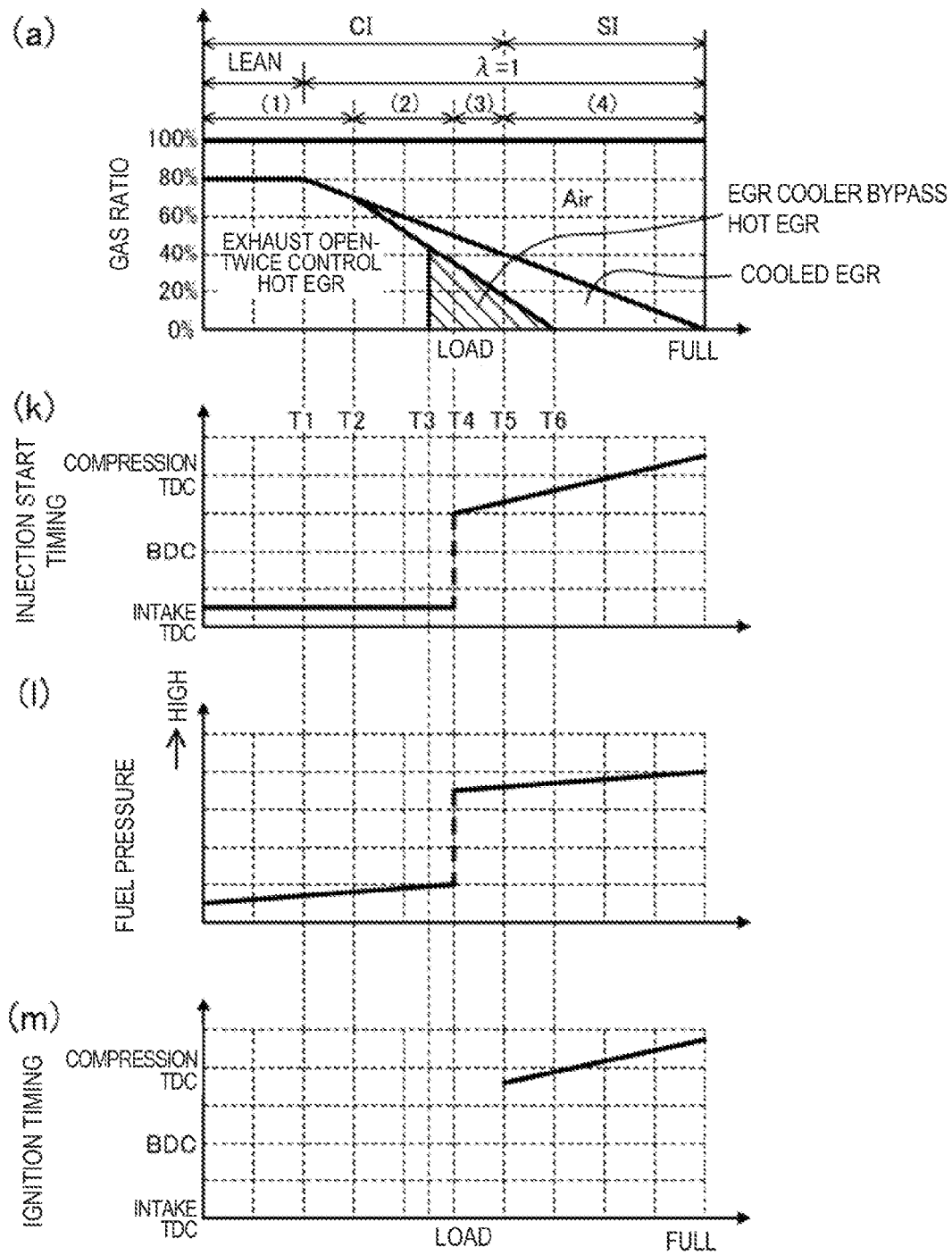
FIG. 10 shows changes in states inside the cylinder with respect to the engine loads, in which the part (a) shows the gas composition inside the cylinder, the part (k) shows the injection start timing, the part (l) shows the fuel pressure, and the part (m) shows the ignition timing.

Additionally, the part (a) of FIG. 10 is also the same as the part (a) of FIG. 7, showing the gas composition inside the cylinder 18. Further, the parts (k) to (m) of FIG. 10 illustrate the control of the fuel injection and the ignition system, in which the part (k) shows the injection start timing, the part (l) shows the fuel pressure, and the part (m) shows the ignition timing.

The part (a) of FIG. 7 indicates the state inside the cylinder 18 as described above, in which the operating mode is the CI mode within the range on the left side of the part (a) where the engine load is below the first load (predetermined load T5), and the operating mode is the SI mode within the range on the right side of the part (a) where the engine load is higher than the first load. The fuel amount (total fuel amount, not illustrated) to be injected into the cylinder 18 is increased as the engine load increases regardless of being in the CI mode or the SI mode.

(Below Predetermined Load T1)

In the CI mode, within the range where the engine load is below the predetermined load T1 (corresponding to the range (1) in the operation map in FIG. 4), fresh air and the internal EGR gas are introduced to create lean mixture gas. Specifically, while the opening of the throttle valve 36 is fully opened as shown in the part (h) of FIG. 9, the exhaust VVL 71 is turned on as shown in the part (e) of FIG. 8 to perform the exhaust open-twice control in which the exhaust valve 22 is opened on the intake stroke. Moreover, as shown in the part (g) of FIG. 8, the lift of the intake valve 21 is set to a minimum, and thus, the internal EGR ratio (the ratio of the internal EGR gas amount introduced into the cylinder 18) increases to a maximum level (also see "S1" in FIG. 11). As described above, within the range (1), for example, mixture gas may be set to be about as lean as the air excess ratio of $\lambda \geq 2.4$. In combination of the lean mixture gas with the introduction of the large amount of internal EGR gas into the cylinder 18, the combustion temperature decreases and the generation of RawNOx is suppressed. Moreover, the introduction of the large amount of EGR gas into the cylinder 18 is also advantageous in reducing the pumping loss. Note that, as shown in the parts (k) and (l) of FIG. 10, within the range (1), the fuel injection is performed at the relatively low fuel pressure in the intake stroke period, and the fuel pressure gradually increases as the engine load increases.

Below the predetermined load T1 (more specifically, below a predetermined load T2), as shown in the part (b) of FIG. 7, the introduction of the large amount of internal EGR gas into the cylinder 18 leads to increasing the temperature inside the cylinder 18, particularly the temperature at the CTDC increases, and becomes advantageous in improving the ignitability of the compression ignition and the stability of the compression-ignition combustion. Here, increasing the temperature inside the cylinder 18 by introducing the high-temperature internal EGR gas into the cylinder 18 as described above seems to contradict decreasing the combustion temperature by introducing the large amount of internal EGR gas into the cylinder 18 to suppress the generation of RawNOx. However, while the generation amount of RawNOx significantly increases about when the air temperature exceeds substantially 1800K, since the internal EGR gas hardly contributes in new combustion because it is gas which is combusted once after all, and the combustion heat when fresh air is combusted is used in increasing the temperature of a large amount (80% of the total gas amount) of the internal EGR gas, the combustion temperature decreases (e.g., to about 1500K) compared to when only fresh air exists within the cylinder 18, the generation of RawNOx is suppressed. Thus, the above combination does not contradict.

As shown in the part (c) of FIG. 7, the oxygen concentration gradually reduces as the engine load increases. Note that, although it is not illustrated, within the low engine load range or a middle engine load range below a predetermined load T6 where the hot EGR gas is introduced into the cylinder 18, by closing the intercooler bypass valve 351, fresh air after being warmed up by the intercooler/warmer 34 may be introduced into the cylinder 18.

(Between Predetermined Loads T1 and T2)

At engine loads above the predetermined load T1, the air fuel ratio of the mixture gas is set to the theoretical air fuel ratio ($\lambda \approx 1$). Therefore, the fresh air amount introduced into the cylinder 18 increases as the injected fuel amount increases, and accordingly, the EGR ratio reduces (see the part (a) of FIG. 7). Also in between the predetermined load T1 and the predetermined load T2, the fuel injection is performed in the intake stroke period at a relatively low fuel pressure (see the parts (k) and (l) of FIG. 10).

Moreover, between the predetermined load T1 and the predetermined load T2, while the throttle valve is basically fully opened as shown in the part (h) of FIG. 9, the exhaust VVL 71 is turned on as shown in the part (e) of FIG. 8, and the lift of the intake valve 21 is adjusted as shown in the part (g) of FIG. 8, so as to adjust the fresh air amount and the internal EGR gas amount introduced into the cylinder 18.

Figure 11:
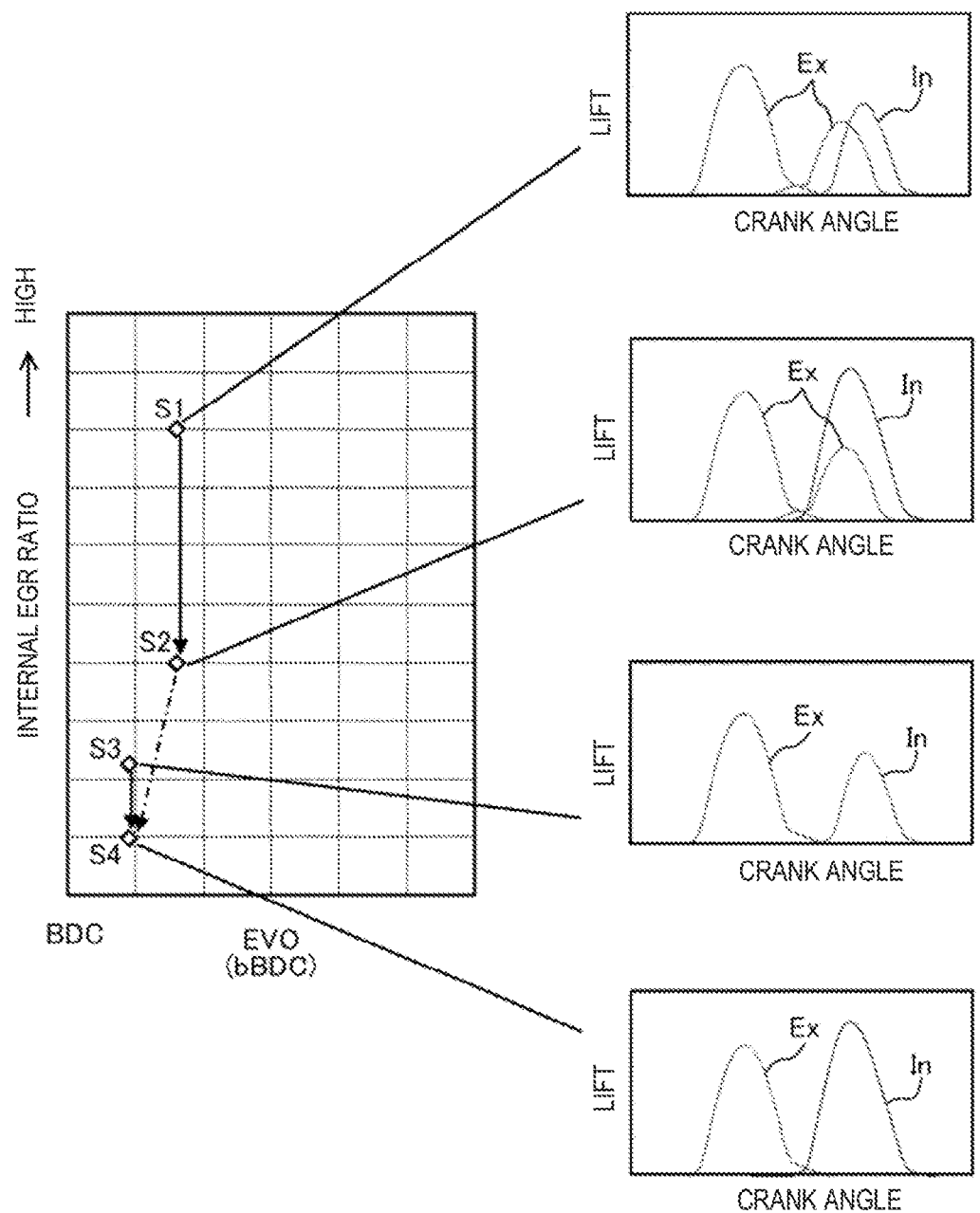
FIG. 11 is a chart showing a relation between the open and close timings of the intake valve and the exhaust valve and the internal EGR ratio.

Specifically, as shown in FIG. 11, when the lift of the intake valve 21 is minimized (see S1 in FIG. 11) in the state where the exhaust VVL 71 is turned on to perform the exhaust open-twice control, the internal EGR ratio reaches the maximum level and the fresh air amount introduced into the cylinder 18 reaches a minimum level. This corresponds to the control of the intake and exhaust valves 21 and 22 below the predetermined load T1, as shown in the parts (e), (f), and (g) of FIG. 8.

When the lift of the intake valve 21 is increased in the state where the exhaust open-twice control is performed as indicated by S2 in FIG. 11, the open period of the intake valve 21 overlaps with the open period of the exhaust valve 22 when it is opened the second time, and therefore, the internal EGR ratio decreases. Note that, the close timing of the intake valve 21 is substantially fixed even when the lift of the intake valve 21 is changed. When the lift of the intake valve 21 is changed continuously by the control of the CVVL 73 and the VVT 72, the internal EGR ratio can be reduced continuously. Between the predetermined load T1 and the predetermined load T2, the lift of the intake valve 21 is controlled so that the EGR ratio reaches the maximum level, in other words, the internal EGR gas is introduced into the cylinder 18, while keeping the theoretical air fuel ratio $\lambda \approx 1$. Specifically, as shown the parts (e), (f) and (g) of FIG. 8, the lift of the intake valve 21 is gradually increased, and the open timing of the intake valve 21 (IVO) is accordingly advanced gradually.

(Between Predetermined Loads T2 and T3)

The range where the engine load is above the predetermined load T2 corresponds to the range (2) in the operation map in FIG. 4, and within this range, there is a possibility that the temperature inside the cylinder 18 increases to cause pre-ignition. Therefore, at engine loads above the predetermined load T2, the internal EGR gas amount is reduced, and the cooled external EGR gas is introduced into the cylinder 18 instead. Specifically, as shown in the part (i) of FIG. 9, the opening of the EGR valve 511 is gradually increased from the closed state, and thus, the amount of the external EGR gas cooled by passing the EGR cooler 52 is gradually increased due to the increase of the load on the engine 1. Note that, as shown in the part (j) of FIG. 9, the EGR cooler bypass valve 531 remains closed. Thus, the cooled external EGR gas (i.e., cooled EGR gas) is gradually increased as the engine load increases (also see the part (d) of FIG. 7).

On the other hand, as shown in the part (a) of FIG. 7, the EGR ratio including the internal EGR gas and the external EGR gas is reduced at a predetermined ratio with respect to the increase of the engine load so as to set the air fuel ratio of the mixture gas to a theoretical air-fuel ratio ($\lambda \approx 1$) also within the higher engine load range than the predetermined load T2. Therefore, within the higher engine load range than the predetermined load T2, the internal EGR gas amount is reduced according to the increase of the engine load at a higher decreasing rate (i.e., the inclination in the part (a) in FIG. 7 increases). Specifically, as shown in the parts (e), (f) and (g) of FIG. 8, the lift of the intake valve 21 is gradually increased according to the increase of the engine load at a higher increasing rate than within the lower engine load range than the predetermined load T2, and accordingly, the open timing of the intake valve 21 (IVO) is gradually advanced.

Thus, as shown in the part (b) of FIG. 7, the temperature inside the cylinder 18 gradually decreases according to the increase of the engine load on the higher engine load side than the predetermined load T2.

(Between Predetermined Loads T3 and T4)

The adjustment of the introduction amount of the internal EGR gas is, as described above, performed by adjusting the overlapping length of the open period of the intake valve 21 with the open period of the exhaust valve 22 opened in the intake stroke period, which is basically performed by the control of the intake CVVL 73. As indicated by the solid arrow in FIG. 11, although the introduction amount of the internal EGR gas can be reduced continuously to a predetermined amount (see S1 and S2 in FIG. 11), the open period of the exhaust valve 22 cannot be adjusted, and therefore, in order to reduce the introduction amount below the predetermined amount, the exhaust VVL 71 needs to be turned off to suspend the exhaust open-twice control. Therefore, as indicated by S3 and S4 in FIG. 11, due to switching the exhaust VVL 71 between on and off, the introduction amount of the internal EGR gas is reduced intermittently as a result (see the dashed-line arrow in FIG. 11).

Since the internal EGR gas introduced into the cylinder 18 cannot be reduced continuously as above, at a predetermined load T3 within the range (2), the introduction of the internal EGR gas into the cylinder 18 is suspended, and as a substitute hot EGR gas, the external EGR gas after bypassing the EGR cooler 52 and not cooled is introduced into the cylinder 18.

Specifically, as shown in the part (e) of FIG. 8, while the exhaust VVL 71 is turned off to suspend the exhaust open-twice-control, as shown in the part (f) of FIG. 8, the lift of the intake valve 21 is intermittently and greatly changed, and the open timing of the intake valve 21 is accordingly greatly advanced to near an intake top dead center (ITDC) as shown in the part (g) of FIG. 8. Note that, at least on the higher engine load side than the predetermined load T3 in the CI mode, the open and close timings of the intake valve 21 and the exhaust valve 22 are respectively kept fixed regardless of the engine load.

Moreover, as shown in the part (i) of FIG. 9, the opening of the EGR valve 511 is changed to be fully opened, as well as the opening of the EGR cooler bypass valve 531 as shown in the part (j) of FIG. 9. Furthermore, as shown in the part (h) of FIG. 9, the opening of the throttle valve 36 is temporarily throttled so as to increase the EGR ratio to 50% or higher. Thus, as shown in the part (d) of FIG. 9, a required amount of hot EGR gas (i.e., the non-cooled external EGR gas) is introduced into the cylinder 18 at the predetermined load T3. In order to reduce the hot EGR gas amount corresponding to the increase of the engine load, on the higher engine load side than the predetermined load T3, while the opening of the EGR cooler bypass valve 531 is gradually reduced from the fully-opened state as shown in the part (j) of FIG. 9, the opening of the throttle valve 36 is gradually opened more to be fully opened while keeping the EGR valve 511 fully opened, so that the cooled EGR gas amount increases corresponding to the increase of the engine load.

(Between Predetermined Loads T4 and T5)

At engine loads above a predetermined load T4 in the CI mode, achieving both securing the ignitability of the compression-ignition and avoiding the abnormal combustion (e.g., pre-ignition) is difficult by only adjusting the introduction ratio between the cooled EGR gas and the hot EGR gas. Therefore, the high pressure retarded injection is performed. The range where the engine load is above the predetermined load T4 corresponds to the range (3) in the operation map of FIG. 4.

As shown in the part (k) of FIG. 10, the fuel injection start timing is greatly changed from during the intake stroke within the ranges (1) and (2) to near the CTDC. Moreover, as shown in the part (l) of FIG. 10, the fuel pressure is also greatly changed from the low fuel pressure within the ranges (1) and (2) to the high fuel pressure of 30 MPa or above. Although the fuel injection mode is greatly changed between the ranges (2) and (3) as described above, since the gas composition inside the cylinder 18 continuously changes, each of the open and close periods of the intake valve 21 and the exhaust valve 22, the opening of the throttle valve 36, the opening of the EGR valve 511, and the opening of the EGR cooler bypass valve 531 do not change rapidly (see the parts (e), (f) and (g) of FIG. 8, and the parts (h), (i) and (j) of FIG. 9). This is advantageous in suppressing the generation of, for example, torque shock when shifting from within the range (2) to the range (3), and can simplify the control.

On the higher engine load side than the predetermined load T4, the start timing of the fuel injection as the high pressure retarded injection is, as shown in the part (k) of FIG. 10, advanced gradually according to the increase of the engine load. Moreover, the fuel pressure is, as shown in the part (l) of FIG. 10, also set high according to the increase of the engine load. Due to the increase of the engine load, pre-ignition may occur more easily, and the pressure increase may be more significant. Therefore, the fuel injection start timing is further retarded and the fuel pressure is set further higher to effectively avoid the above problem.

Moreover, between the predetermined load T4 and a predetermined load T5, while the opening of the throttle valve 36 is fixed to be fully opened (see the part (h) of FIG. 9), each of the opening of the EGR valve 511 and the opening of the EGR cooler bypass valve 531 decreases according to the increase of the engine load (see the parts (i) and (j) of FIG. 9). Note that, when comparing the opening of the EGR valve 511 to the opening of the EGR cooler bypass valve 531, the opening of the EGR cooler bypass valve 531 has a higher decreasing rate therebetween.

(Between Predetermined Loads T5 and T6)

The predetermined load T5 corresponds to the boundary of switching between the CI mode and the SI mode, and the higher engine load side than the predetermined load T5 corresponds to the SI mode. Since the air fuel ratio of the mixture gas is set to the theoretical air fuel ratio ($\lambda \approx 1$) in both the lower and higher engine load sides sandwiching therebetween the boundary of switching between the CI mode and the SI mode, the EGR ratio is set to reduce continuously from the CI mode to the SI mode. In shifting from the CI mode to the SI mode where the combustion mode is switched, the reducing EGR ratio causes no significant change other than starting the spark ignition, smoothens the switch from the CI mode to the SI mode and the other way around as well, and can suppress the generation of torque shock, etc. Since the control responsiveness regarding the recirculation of the exhaust gas through the EGR passage 50 is particularly comparatively low, the control avoiding a rapid change in the EGR ratio is effective in improving the controllability.

Moreover, in the CI mode, due to the EGR ratio set as high as possible as described above, the EGR ratio becomes high within the low engine load range in the SI mode near the boundary with the CI mode. Although advantageous in reducing the pumping loss, the high EGR ratio may become disadvantageous regarding the combustion stability in the SI mode.

There, within the low engine load range in the SI mode, specifically, on the lower engine load side than the predetermined load T6, the hot EGR gas is introduced into the cylinder 18. Specifically, the non-cooled external EGR gas after passing through the EGR cooler bypass passage 53 is introduced into the cylinder 18. Thus, as shown in the part (b) of FIG. 7, the temperature inside the cylinder 18 is set relatively high and the time length by which the ignition is retarded is shortened to improve the stability of the spark-ignition combustion under the high EGR ratio environment.

Specifically, as shown in the parts (i) and (j) of FIG. 9, each of the opening of the EGR valve 511 and the opening of the EGR cooler bypass valve 531 is gradually reduced according to the increase of the engine load, continuously from the CI mode. Thus, the cooled EGR gas amount increases and the hot EGR gas amount decreases while the engine load increases, and the EGR ratio including the cooled EGR gas and the hot EGR gas gradually decreases while the engine load increases. Therefore, the fresh air amount increases. Since, at engine loads above the predetermined load T6, the combustion stability improves by the temperature increase inside the cylinder 18, the EGR cooler bypass valve 531 is closed to reduce the hot EGR gas amount to zero. Here, the EGR valve 511 is opened. Moreover, between the predetermined load T5 and the predetermined load T6, the opening of the throttle valve is kept fully opened (see the part (h) of FIG. 9) and the open and close timings of the intake valve 21 and the exhaust valve 22 are fixed (see the parts (e), (f) and (g) of FIG. 8).

On the other hand, the fuel injection start timing is, as shown in the part (k) of FIG. 10, gradually retarded according to the increase of the engine load, and the fuel pressure is, as shown in the part (l) of FIG. 10, gradually increased also according to the increase of the engine load. Further, the ignition timing is, as shown in the part (m) of FIG. 10, gradually retarded according to the increase of the engine load, along with the fuel injection start timing. Note that, within the range on the low engine load side in the SI mode between the predetermined load T5 and the predetermined load T6, although the spark ignition is performed by operating the ignition plug 25, the combustion mode is not limited to the mode where the flame core is produced by the spark ignition and the flame propagates, and may be a mode where the low-temperature oxidation reaction is stimulated by the spark ignition to self-ignite.

(Above Predetermined Load T6)

In the SI mode, on the higher engine load side than the predetermined load T6, as shown in the parts (a) and (d) of FIG. 7, the hot EGR gas amount becomes zero, and only the cooled EGR gas is introduced into the cylinder 18. Note that, although it is not illustrated, on the higher engine load side than the predetermined load T6, the intercooler bypass valve 351 may be opened (e.g., the opening of the intercooler bypass valve 351 may be gradually increased according to the increase of the engine load) to increase the fresh air amount bypassing the intercooler/warmer 34, and thus, the temperature of fresh air introduced into the cylinder 18 may be lowered. The lowered fresh air temperature leads to lowering the temperature inside the cylinder 18 and is advantageous in avoiding the abnormal combustion (e.g., pre-ignition and knocking) in the higher engine load range.

Moreover, the opening of the throttle valve 36 is kept fully opened as shown in the part (h) of FIG. 9, and the opening of the EGR valve 511 is gradually reduced according to the increase of the engine load to be fully closed at the full engine load as shown in the part (i) of FIG. 9. Therefore, the EGR ratio is zero at the full engine load (see the parts (a) and (d) of FIG. 7). On the other hand, the lift of the intake valve 21 is gradually increased according to the increase of the engine load to be a maximum lift at the full engine load as shown in the parts (f) and (g) of FIG. 8. By increasing the fresh air amount introduced into the cylinder 18 according to the increase of the engine load as above, the torque on the high engine load part of the operating range of the engine 1 is increased.

Further, as shown in the parts (k), (l) and (m) of FIG. 10, the fuel injection start timing is gradually retarded according to the increase of the engine load, and the fuel pressure is set gradually higher according to the increase of the engine load. The ignition timing is also gradually retarded according to the increase of the engine load. Although the abnormal combustion easily occurs due to the increase of the engine load, by retarding the ignition start timing and increasing the fuel pressure, it can effectively be avoided.

Figure 12:
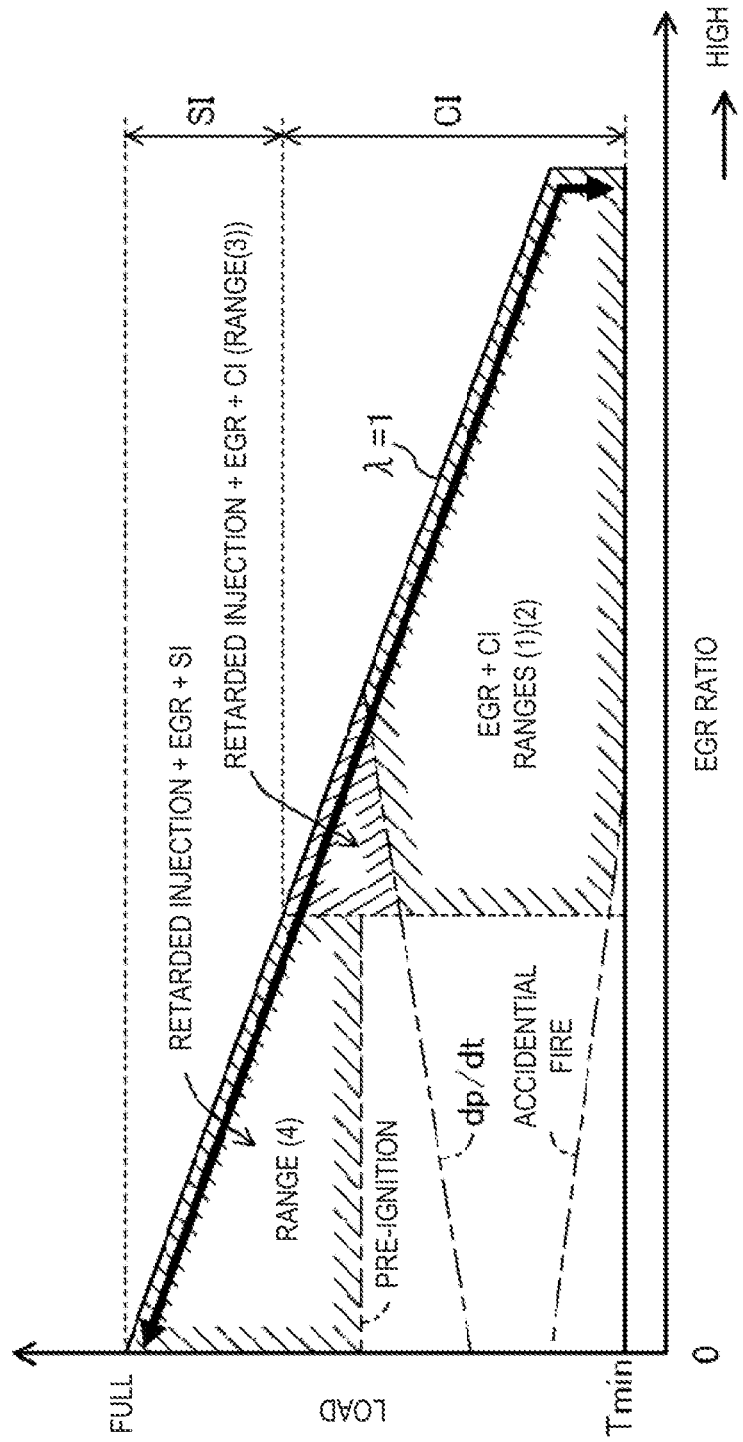
FIG. 12 is a chart showing a relation between the EGR ratio and the engine load in a predetermined speed.

As described above, the change of each parameter with respect to the level of the engine load is described with reference to FIGS. 7 to 10. Meanwhile, FIG. 12 shows a relation between the EGR ratio and the engine load. As described above, while the air fuel ratio is set lean within the low engine load range, within the higher engine load range than the low engine load range, the air fuel ratio is fixed at the theoretical air fuel ratio ($\lambda \approx 1$) regardless of the level of the engine load and difference in combustion mode. The engine 1 is controlled along a control line indicated by the thick solid arrow in FIG. 12, and the EGR ratio is set to the maximum level under a condition of setting the air fuel ratio to the theoretical air fuel ratio ($\lambda \approx 1$). Therefore, the EGR ratio continuously changes with respect to the level of the engine load regardless of switching the combustion mode. Since the continuous change of the EGR ratio leads to a continuous change of the gas composition inside the cylinder 18 when the engine load continuously changes, it is advantageous in improving the controllability.

In the combustion mode where the compression-ignition combustion is performed by injecting the fuel during the intake stroke while introducing a large amount of EGR gas into the cylinder 18 (i.e., corresponding to the ranges (1) and (2)), as indicated by the dashed line in FIG. 12, the engine load cannot reach above a predetermined level because of the restriction of dP/dt. However, here, due to performing the high pressure retarded injection in which the fuel is injected at the high fuel pressure of 30 MPa or above near the CTDC, and introducing the comparatively large amount of EGR gas into the cylinder 18, the compression-ignition combustion can be stably performed while subsiding the combustion to eliminate the restriction of dP/dt. This restriction elimination corresponds to the combustion mode within the range (3) in FIG. 4, and the CI mode applicable range can be expanded to the high load range side. It can be said that the continuous change of the EGR ratio according to the level of the engine load can be realized by providing the range (3).

Due to the high geometric compression ratio of the engine 1, within the range of the SI combustion where the abnormal combustion (e.g., pre-ignition) may occur (see the dashed line in FIG. 12), by performing the high pressure retarded injection, such an abnormal combustion can be avoided and a stabilized spark-ignition combustion can be performed. Also, since the high pressure retarded injection improves the combustion stability, it is advantageous in securing predetermined combustion stability even when a high EGR ratio is set at the engine load immediately after the CI mode is switched to the SI mode. This is another factor enabling the continuous change of the EGR ratio with respect to the level of the engine load.

Thus, with the engine 1 accompanied by the switching between the SI mode and the CI mode, securing the state quantity inside the cylinder 18 with respect to the level of the engine load is advantageous in suppressing torque shock and the like when switching the mode.

Moreover, with the engine 1 where the geometric compression ratio is set high, the volume of the combustion chamber 19 becomes comparatively small at the timing of injecting the fuel in the high pressure retarded injection. Although the high pressure retarded injection may be disadvantageous in view of air utilization ratio within the combustion chamber 19, since the fuel is injected into the cavity 141 at the high fuel pressure in the high pressure retarded injection, the flow within the cavity 141 is increased, and as a result, the air utilization ratio is increased. Especially since the direct injector 67 is a multi-hole type direct injector, it effectively increases the gas turbulence kinetic energy inside the cavity 141 and becomes advantageous in increasing the air utilization ratio.

As a result, within the range (3) in the CI mode, the comparatively lean mixture gas is rapidly formed, and the ignitability and stability of the compression-ignition combustion improve. Similarly, the abnormal combustion is also avoided within the range (4) in SI mode.

(Other Embodiments)

The present invention should not be limited to the above embodiment, and it may be implemented in other various forms without deviating from the spirit of the subject matters. In other words, the application of the present invention is not limited to the above described engine configuration. For example, the fuel injection in the intake stroke period may be performed into the intake port 16 by a port injector separately provided in the intake port 16, instead of the direct injector 67 provided in the cylinder 18.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas for the predetermined operating range is set to the theoretical air-fuel ratio ($\lambda \approx 1$) and the three-way catalyst can be used; however, not limited to this, for example, if an NOx trap catalyst (LNT: Lean NOx Trap) is used, the air-fuel ratio of the mixture gas may be set lean.

Moreover, the operating ranges shown in FIG. 4 are merely an example, and other various operating ranges may be provided.

Furthermore, the high pressure retarded injection may be split injections as needed. Similarly, the intake stroke injection may also be split injections as needed. With these split injections, the fuel may be injected on the intake stroke and the compression stroke.

Thus, the above-described embodiments are merely illustrations in all aspects, and therefore, it must not be interpreted in a limited way. In addition, all of the modifications and changes falling under the equivalent range of the claims are within the scope of the present invention.

As described above, the present invention is useful for spark-ignition engines configured to combust mixture gas inside a combustion chamber by compression self-ignition within a CI combustion applying range on the lower engine load side than a predetermined load, and to combust mixture gas inside the combustion chamber by spark-ignition within an SI combustion applying range on the higher engine load side than the predetermined load.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE NUMERALS

1 Engine (Engine Body)
10 PCM (Controller)
18 Cylinder
19 Combustion Chamber
25 Ignition Plug
62 High-pressure Fuel Supply System (Fuel Pressure Changeable Mechanism)
67 Direct Injector (Fuel Injection Valve)
73 CVVL (EGR Introduction System)
511 EGR Valve (EGR Introduction System)
531 EGR Cooler Bypass Valve (EGR Introduction System)

The invention claimed is:

1. A spark-ignition engine, comprising:
an engine body having a cylinder forming a combustion chamber in a top part thereof, and for supplying fuel mainly containing gasoline;
a fuel injection valve for injecting the fuel into the combustion chamber;
an ignition plug arranged to be oriented toward inside the combustion chamber and for igniting mixture gas within the combustion chamber;
an EGR introduction system for introducing exhaust gas into the cylinder; and
a controller for operating the engine body by controlling at least the fuel injection valve, the ignition plug, and the EGR introduction system, the controller controlling to combust the mixture gas within the combustion chamber by being compressed to self-ignite within a compression self-ignition combustion applying range that is lower in an engine load than a predetermined first engine load, and to combust the mixture gas within the combustion chamber by a spark-ignition using the ignition plug within a spark-ignition combustion applying range that is higher in the engine load than the first engine load,
wherein throughout the whole spark-ignition combustion applying range except for a throttle valve fully opened range, the controller controls the EGR introduction system to introduce into the cylinder at least low-temperature cooled EGR gas that is exhaust gas cooled by a heat exchange, and within the compression self-ignition applying range the controller controls the EGR introduction system to introduce into the cylinder at least hot EGR gas having a higher temperature than the cooled EGR gas, and
wherein the controller controls the EGR introduction system to introduce the hot EGR gas in addition to the cooled EGR gas into the cylinder at least within a low engine load part of the spark-ignition combustion applying range.

2. The engine of claim 1, wherein within the spark-ignition combustion applying range, the controller controls the EGR introduction system to reduce a ratio of an EGR gas amount with respect to the total amount of gas introduced into the cylinder as the engine load increases, and within the compression self-ignition combustion applying range, the controller controls the EGR introduction system to reduce the EGR gas amount ratio as the engine load increases from at least a second engine load toward the spark-ignition combustion applying range, the second engine load being within the compression self-ignition combustion applying range and lower than the first engine load, and
wherein throughout at least a part of the compression self-ignition combustion applying range higher than the second engine load, and the spark-ignition combustion applying range except for the throttle valve fully opened range, the controller controls the EGR introduction system to keep an in-cylinder air-fuel ratio fixed with respect to fresh air that is reduced due to the EGR gas introduced into the cylinder.

3. The engine of claim 1, wherein within the low engine load part of the spark-ignition combustion applying range, the controller controls the EGR introduction system such that the hot EGR gas is introduced into the cylinder in addition to the cooled EGR gas and a ratio of a hot EGR gas amount with respect to the total amount of gas introduced into the cylinder is reduced as the engine load increases, and within a high engine load part of the spark-ignition combustion applying range, the controller controls the EGR introduction system to only introduce the cooled EGR gas into the cylinder.

4. The engine of claim 3, wherein the EGR gas introduction into the cylinder within the spark-ignition combustion applying range is performed through an EGR passage branched from an exhaust passage of the engine and merging with an intake passage,
wherein the EGR introduction system is configured with the EGR passage and a valve, the EGR passage including a main passage provided with an EGR cooler for cooling the exhaust gas and an EGR cooler bypass passage for bypassing the EGR cooler, and the valve controlling EGR gas flow amounts of the EGR cooler bypass passage and the main passage, and
wherein the valve is controlled such that the hot EGR gas is introduced into the cylinder via the EGR cooler bypass passage, and the cooled EGR gas is introduced via the main passage.

5. The engine of claim 1, wherein the controller controls the EGR introduction system such that the ratio of a cooled EGR gas amount with respect to the total amount of gas introduced into the cylinder is gradually increased as the engine load increases from a second engine load within the compression self-ignition combustion applying range and lower than the first load to a third engine load within the spark-ignition combustion applying range and higher than the first engine load, and the cooled EGR gas amount ratio is reduced as the engine load increases within a range above the third engine load.

6. The engine of claim 5, further comprising a fuel pressure changeable mechanism for changing a pressure of the fuel injected by the fuel injection valve,
wherein the controller controls the fuel injection valve to perform an intake stroke injection within a low engine load part of the compression self-ignition combustion applying range, and
wherein within a high engine load part of the compression self-ignition combustion applying range and the low engine load part of the spark-ignition combustion applying range, the controller sets the fuel injection pressure of the fuel injection valve to a predetermined pressure of 30 MPa or above by using the fuel pressure changeable mechanism, and controls the fuel injection valve such that a fuel injection start timing before ignition is in a period from a late stage of compression stroke to an early stage of expansion stroke.

7. The engine of claim 6, wherein within the low engine load part of the compression self-ignition combustion applying range, the controller sets the fuel injection pressure of the fuel injection valve to a low fuel pressure of below 30 MPa by using the fuel pressure changeable mechanism.

* * * * *